(12) United States Patent
Delgado

(10) Patent No.: US 8,381,784 B2
(45) Date of Patent: Feb. 26, 2013

(54) AIR MAINTENANCE PUMPING ASSEMBLY AND TIRE

(75) Inventor: Andres Ignacio Delgado, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 11 days.

(21) Appl. No.: 13/178,767

(22) Filed: Jul. 8, 2011

(65) Prior Publication Data

US 2013/0008579 A1    Jan. 10, 2013

(51) Int. Cl.
*B60C 23/12* (2006.01)

(52) U.S. Cl. .................... 152/415; 152/419; 152/425

(58) Field of Classification Search .............. 152/415, 152/419, 423, 424, 425, 426
See application file for complete search history.

(56) References Cited

U.S. PATENT DOCUMENTS

| | | | |
|---|---|---|---|
| 1,050,886 A * | 1/1913 | Wetherell | 152/426 |
| 1,134,361 A * | 4/1915 | Wetherell | 152/426 |
| 3,304,981 A * | 2/1967 | Sheppard | 152/426 |
| 3,867,973 A | 2/1975 | Cozzolino et al. | 152/153 |
| 5,052,456 A * | 10/1991 | Dosjoub | 152/415 |
| 7,117,731 B2 * | 10/2006 | Hrabal | 73/146 |
| 7,225,845 B2 * | 6/2007 | Ellmann | 152/426 |
| 8,042,586 B2 * | 10/2011 | Losey et al. | 152/426 |
| 8,113,254 B2 * | 2/2012 | Benedict | 152/426 |
| 8,156,978 B1 * | 4/2012 | Hinque et al. | 152/426 |
| 8,235,081 B2 * | 8/2012 | Delgado et al. | 152/419 |
| 2009/0294006 A1 | 12/2009 | Hrabal | 152/426 |

FOREIGN PATENT DOCUMENTS

| | | | |
|---|---|---|---|
| DE | 3433318 A1 * | 3/1986 | |
| EP | 2005/012009 A1 | 2/2005 | |
| SE | 183890 C1 * | 5/1963 | |
| WO | WO 2010008338 A1 * | 1/2010 | |

OTHER PUBLICATIONS

European Search Report mailed to Applicant Nov. 7, 2012.

* cited by examiner

*Primary Examiner* — Kip T Kotter
(74) *Attorney, Agent, or Firm* — Richard B. O'Planick

(57) ABSTRACT

A groove is positioned within the bending region of the first tire sidewall and deforms segment by segment within the rolling tire footprint. An air tube positioned within the sidewall groove is in contacting engagement with groove sidewalls and resiliently squeezes and collapses segment by segment as the groove constricts segment by segment within the rolling tire footprint. A series of adjacent projecting ridges extend from a groove sidewall segment into the groove air passageway, the projecting ridges operatively positioned to vary the applied pressure on the air tube increase the air pressure within the air tube passageway as the air tube rolls segment by segment with the tire through tire footprint. The series of projecting ridges are constructed having a variable amplitude and/or spacing frequency in a direction of air flow within the air passageway to increase the pressure applied to the air tube and air pressure of the air flowing through the tube passageway.

20 Claims, 23 Drawing Sheets

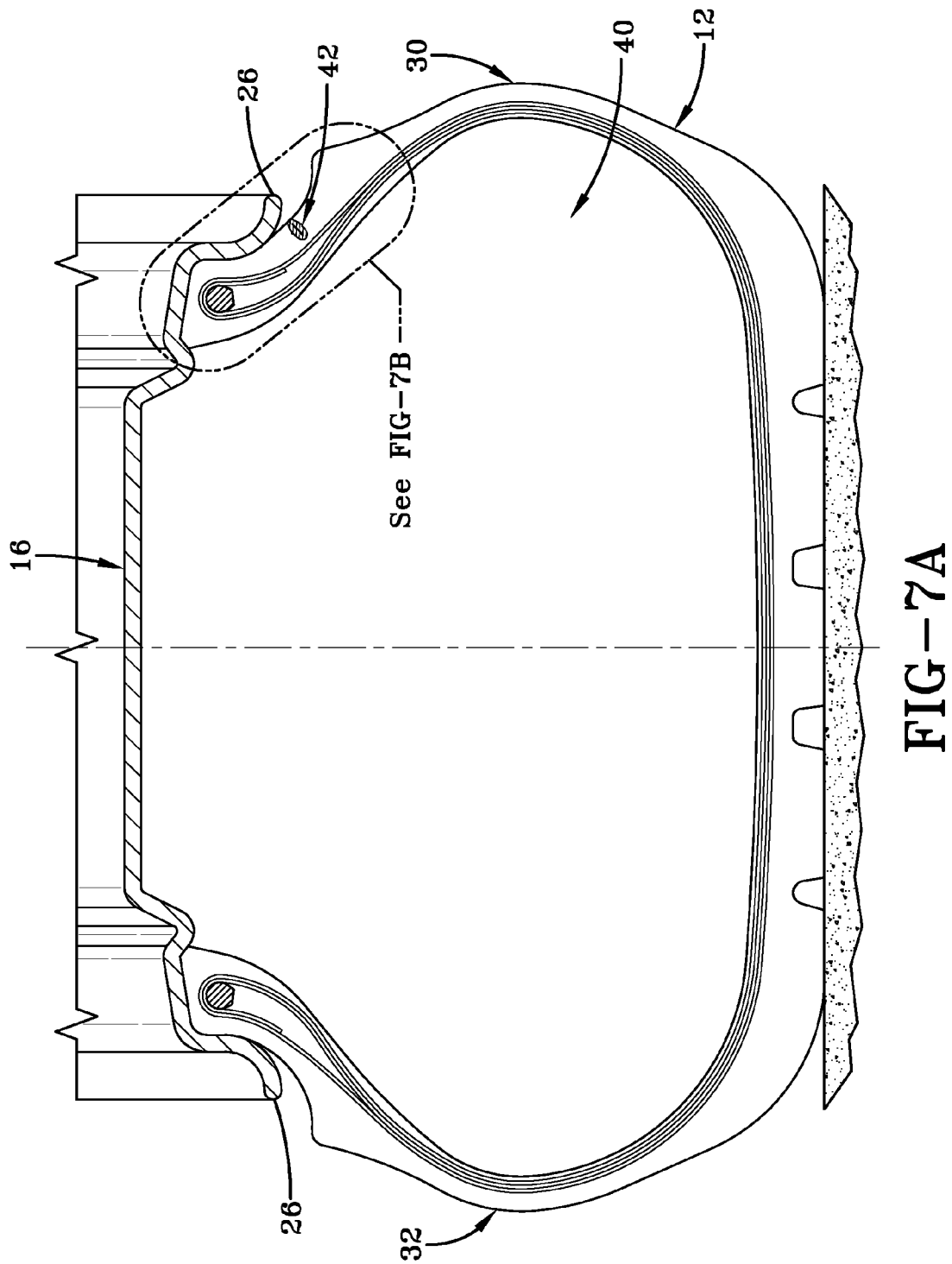

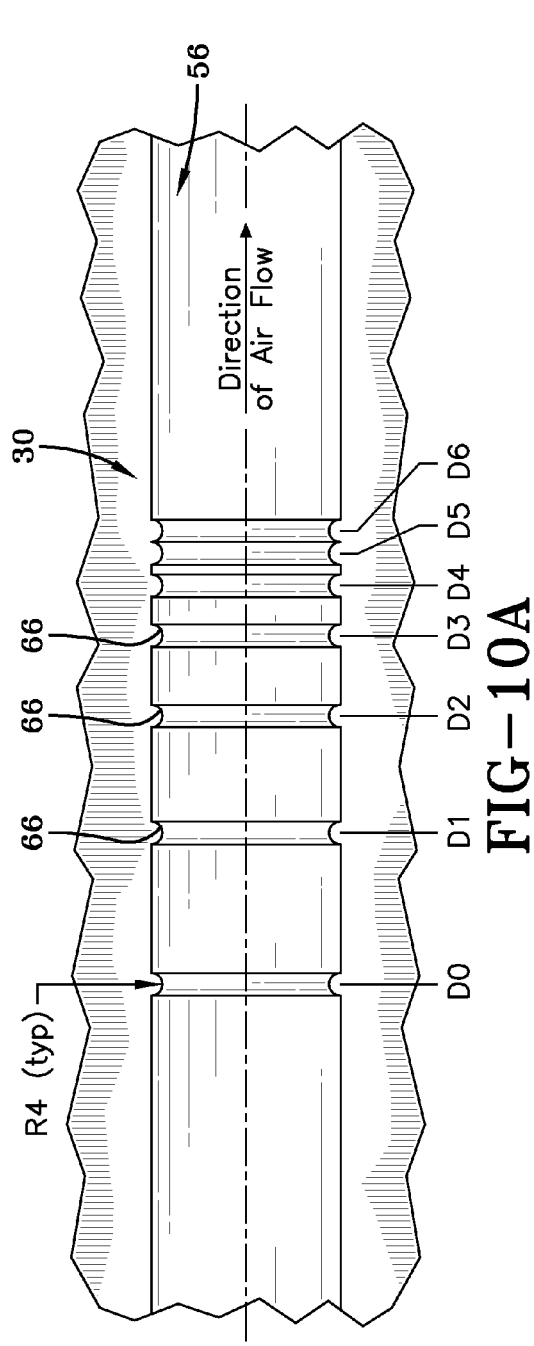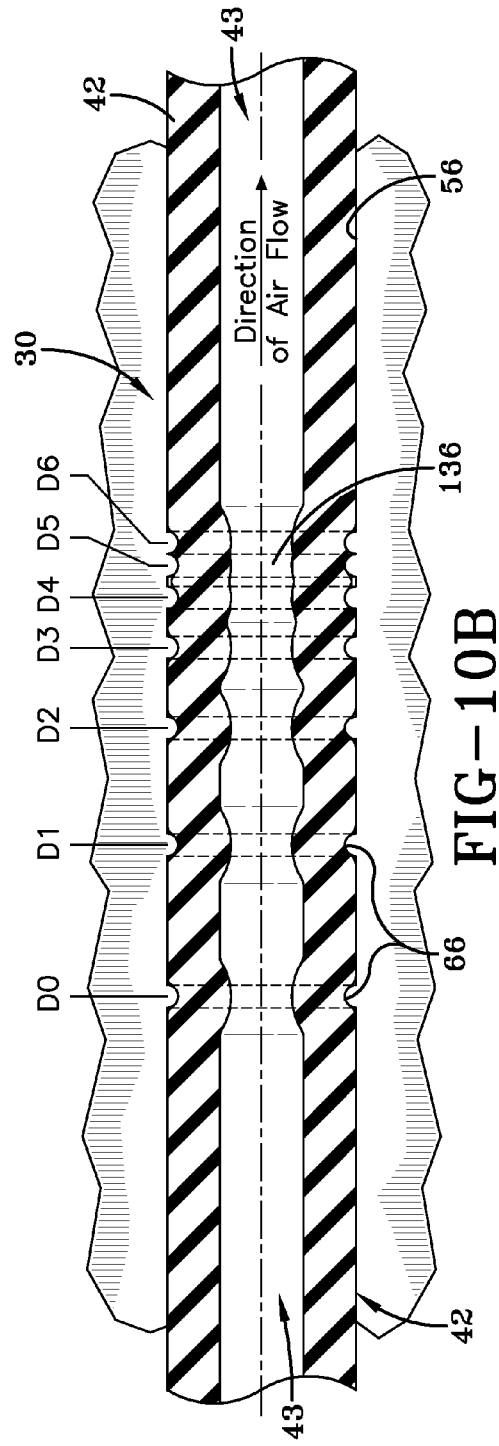
FIG-10A
FIG-10B

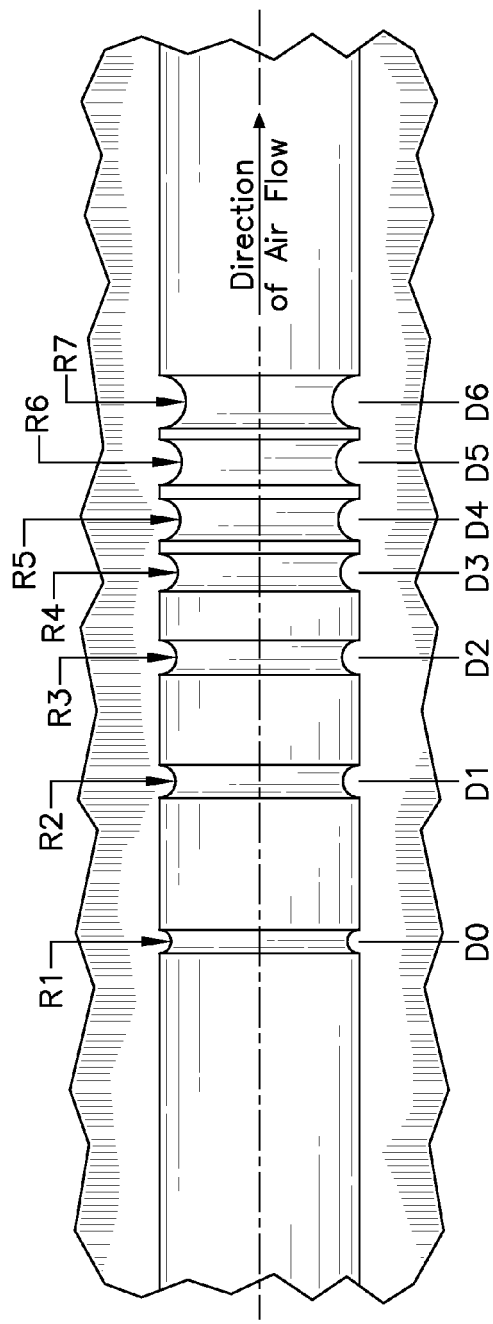
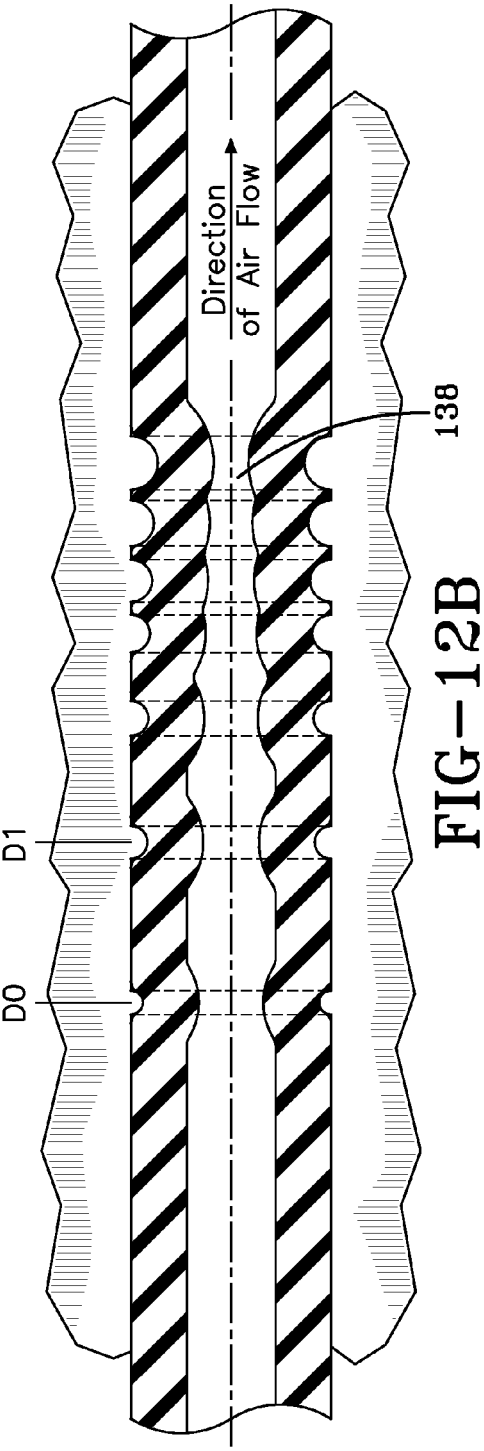
FIG-12A
FIG-12B

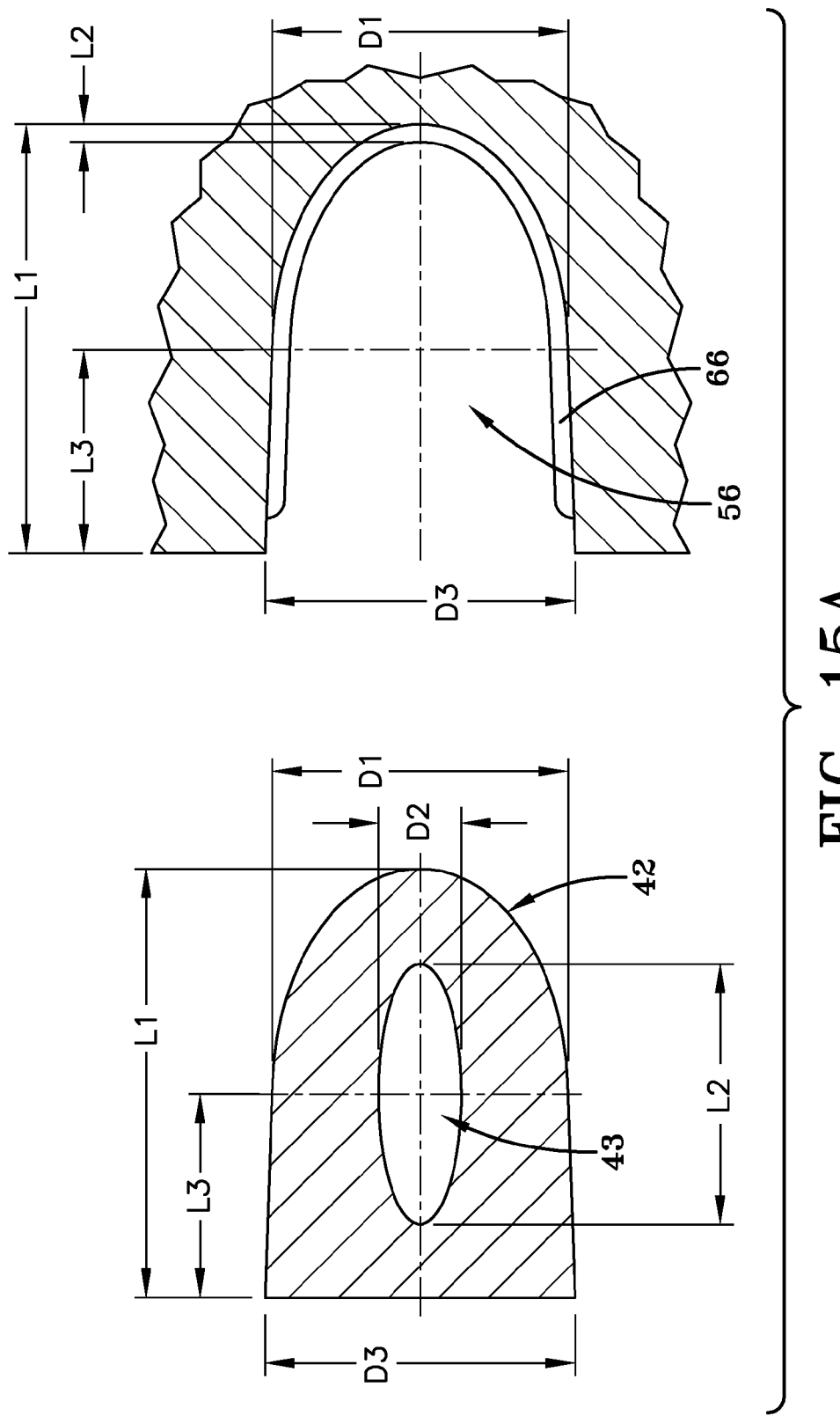

AIR MAINTENANCE PUMPING ASSEMBLY AND TIRE

FIELD OF THE INVENTION

The invention relates generally to air maintenance tires and, more specifically, to an air maintenance and tire pumping assembly.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will maintain air pressure within the tire in order to compensate for any reduction in tire pressure over time without the need for driver intervention.

SUMMARY OF THE INVENTION

In one aspect of the invention, a groove defined by groove sidewalls is positioned within the bending region of the first tire sidewall, the groove deforming segment by segment between a non-deformed state and a deformed constricted state in response to the bending of the first sidewall bending region within the rolling tire footprint. An air tube positioned within the sidewall groove is in contacting engagement with the groove sidewalls and resiliently squeezes and collapses segment by segment as the groove constricts segment by segment within the rolling tire footprint. A series of adjacent projecting ridges extend from a groove sidewall segment into the groove air passageway, the projecting ridges operatively positioned to vary the applied pressure on the air tube increase the air pressure within the air tube passageway as the air tube rolls segment by segment with the tire through tire footprint.

In another aspect, the series of projecting ridges are spaced apart along the air tube passageway at a predetermined spacing frequency in which the frequency of the projecting ridges increases in a direction of air flow within the air passageway, whereby the ridges acting to apply a variable pumping pressure to an air tube of uniform dimensions positioned within the groove. The ridges further act to retain the tube in its intended location within the groove during operation.

According to another aspect, an outlet device is positioned along the air tube for directing air from the air tube toward the tire cavity, and the spacing frequency of the ridges increasing in a direction toward the outlet device.

The amplitude of the ridges is further differentiated in another aspect, the ridges increasing in both frequency and amplitude in a direction toward the outlet device to vary the pressure applied to the air tube and thereby increase the air pressure flowing through the tube passageway.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire dimensioned and configured in section for receipt of a an air tube therein.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a longitudinal outwardly projecting locking decent protrusion.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

FIG. 7A; Section view taken from FIG. 5A.

FIG. 10A; Enlarged detail of groove with "first" rib profile.

FIG. 10B; Enlarged detail of tube pressed into "first" rib profile.

FIG. 12A; Enlarged detail of groove with "second" rib profile.

FIG. 12B; Enlarged detail of tube pressed into "second" rib profile.

FIG. 15A; Enlarged view of a "fourth" embodiment of a tube & groove detail.

DETAILED DESCRIPTION OF THE INVENTION

Figure 1:
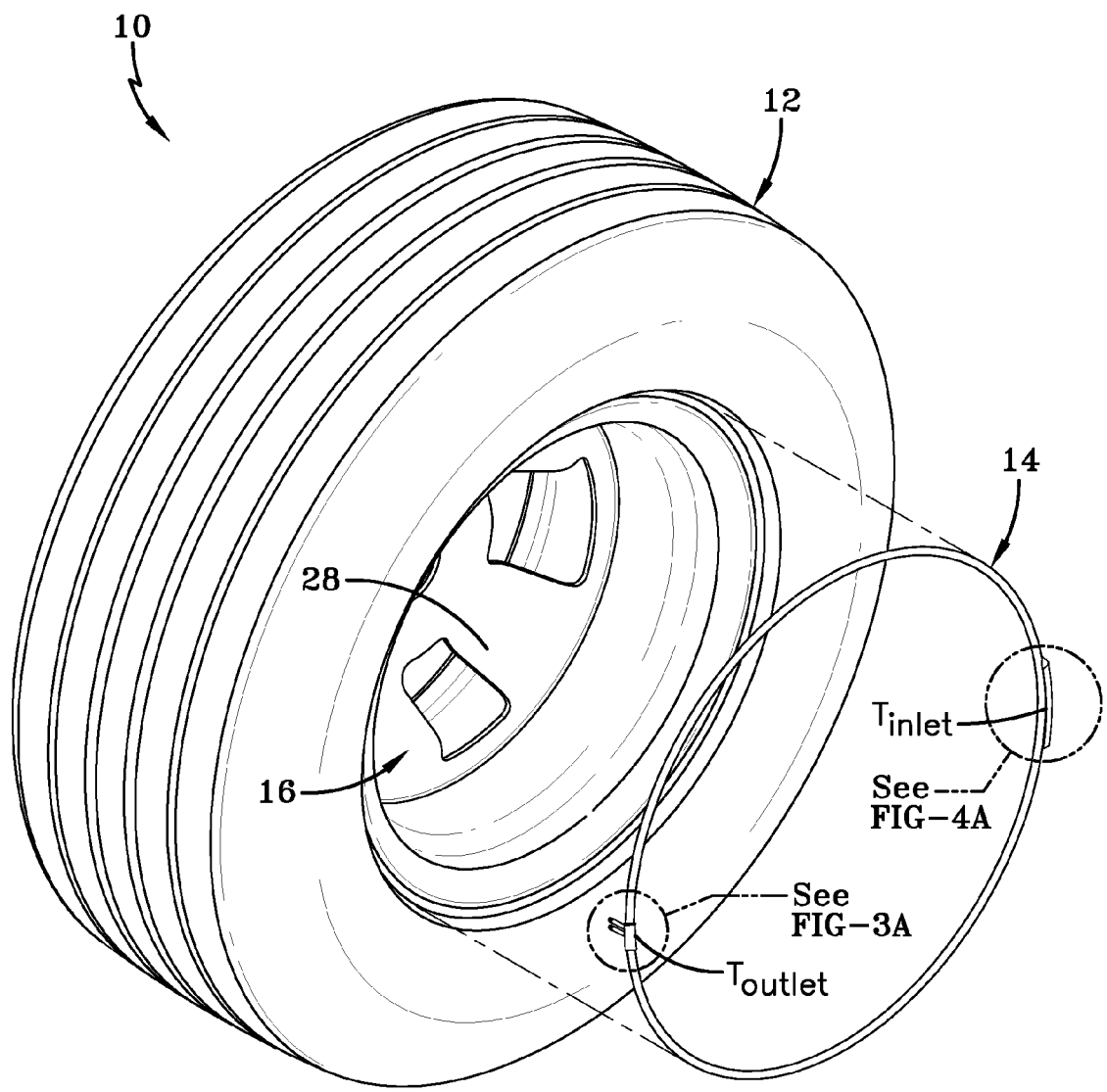
FIG. 1; Isometric exploded view of tire and tube assembly.
Figure 2:
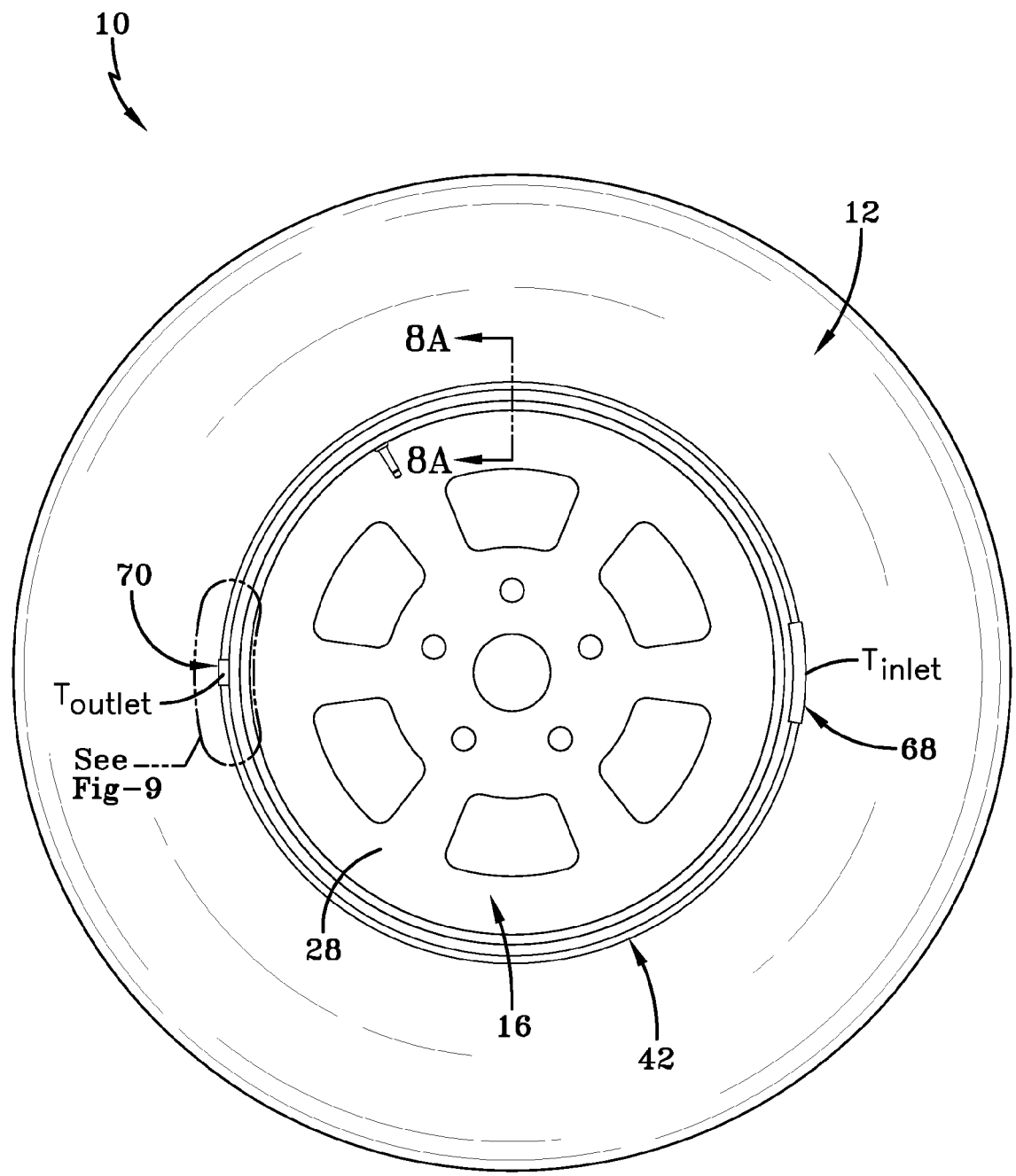
FIG. 2; Side view of tire/tube assembly.
Figure 3B:
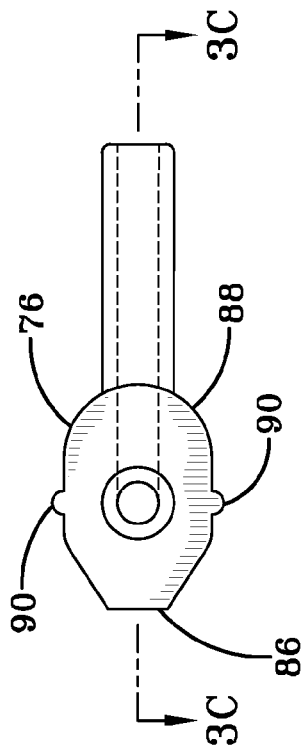
FIG. 3A-3C; Details of outlet connector.
Figure 3C:
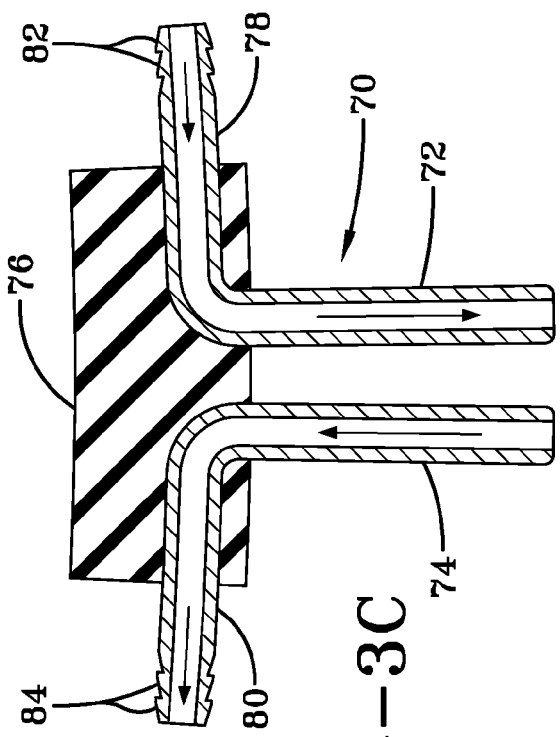
Figure 3A:
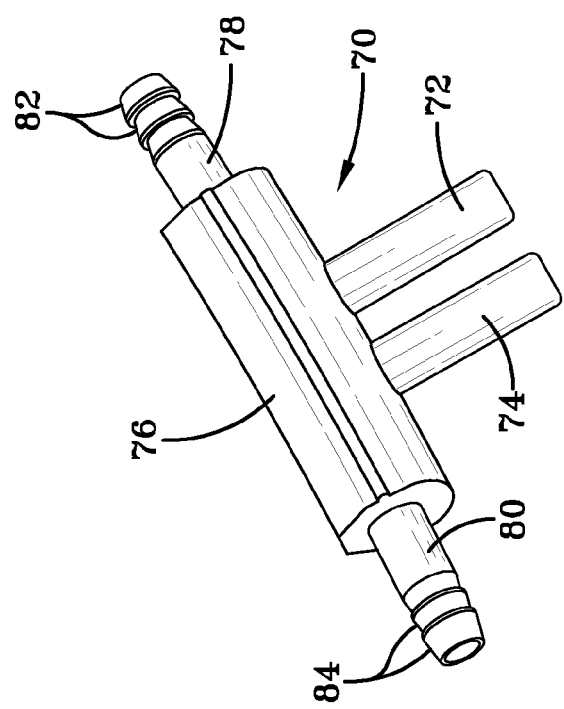
Figure 4A:
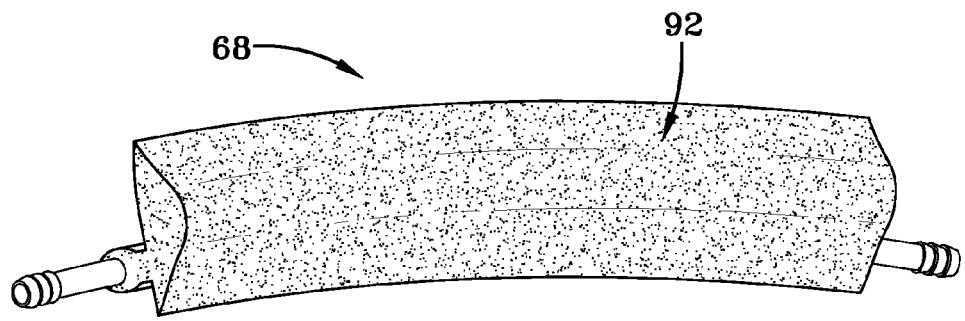
FIG. 4A-4E; Details of inlet (filter) connector.
Figure 4B:
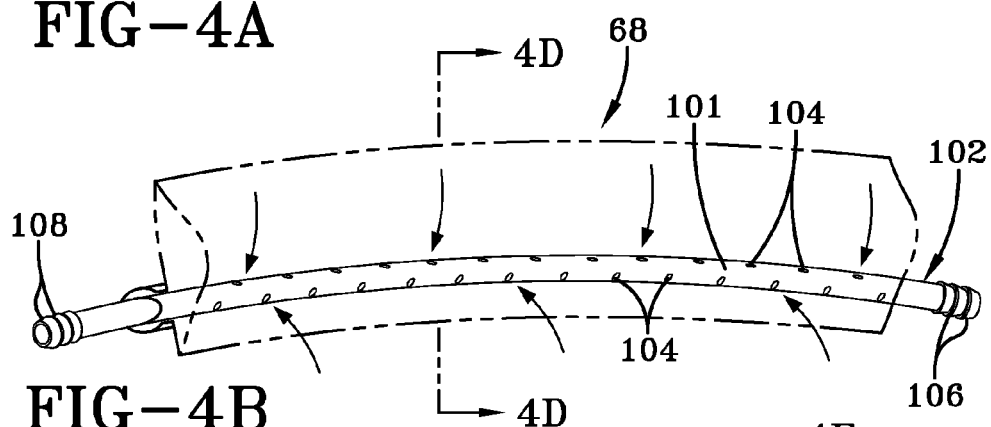
Figure 4C:
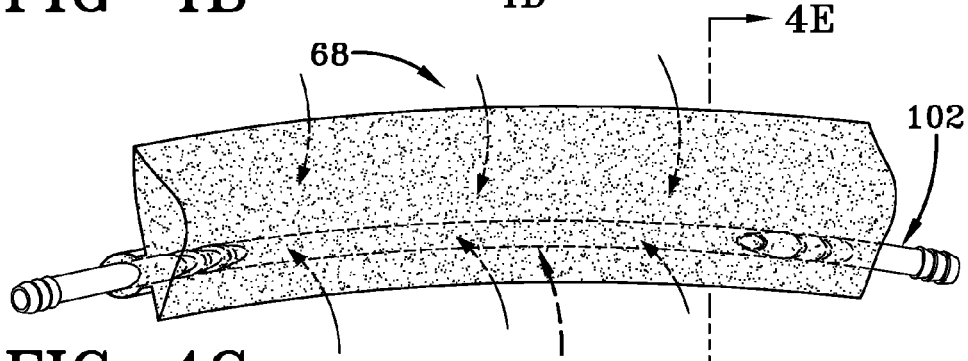
Figure 4D:
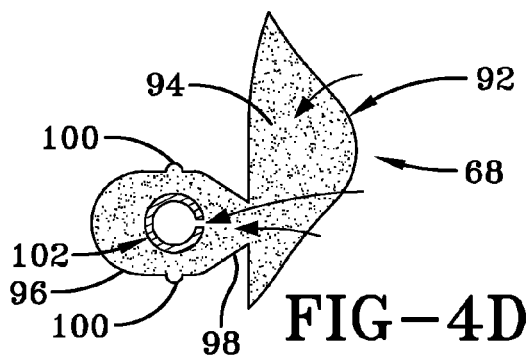
Figure 4E:
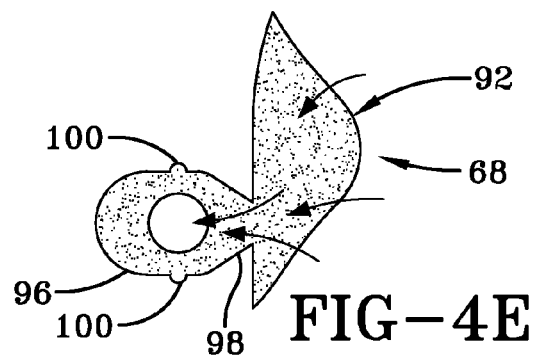
Figure 6A:
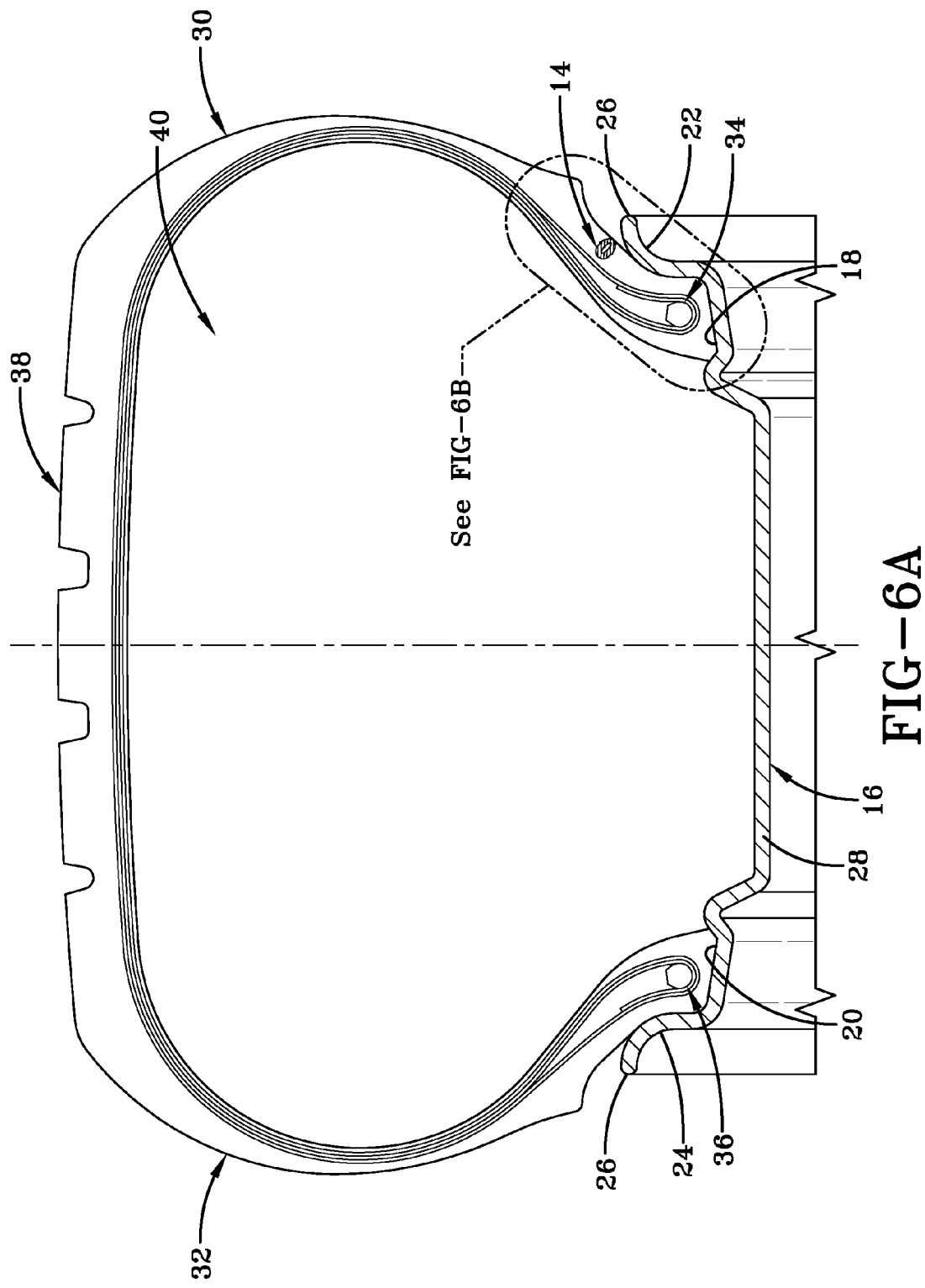
FIG. 6A; Section view taken from FIG. 5A.

Referring to FIGS. 1, 2, and 6A, a tire assembly 10 includes a tire 12, a peristaltic pump assembly 14, and a tire rim 16. The tire mounts in conventional fashion to a pair of rim mounting surfaces 18, 20 adjacent outer rim flanges 22, 24. The rim flanges 22, 24, each have a radially outward facing flange end 26. A rim body 28 supports the tire assembly as shown. The tire is of conventional construction, having a pair of sidewalls 30, 32 extending from opposite bead areas 34, 36 to a crown or tire read region 38. The tire and rim enclose a tire cavity 40.

As seen from FIGS. 2 and 3A, 3B, 3C, 6B and 8A, the peristaltic pump assembly 14 includes an annular air tube 42 that encloses an annular passageway 43. The tube 42 is formed of a resilient, flexible material such as plastic or rubber compounds that are capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described. In the configuration shown, the tube 42 is of elongate, generally elliptical shape in section, having opposite tube sidewalls 44, 46 extending from a flat trailing tube end 48 to a radiussed leading tube end 50. The tube 42 is configured having a longitudinal outwardly projecting pair of locking detent ribs 52, 54 of generally semi-circular cross-section and each rib extending along outward surfaces of the sidewalls 44, 46, respectively. As referenced in FIG. 8A, the tube 42 has a length L1 within a preferred range of 3.65 to 3.8 mm; a preferred width of D1 within a range of 2.2 to 3.8 mm; a trailing end preferred width of D3 within a range of 0.8 to 1.0 mm. The protruding detent ribs 52, 54 each have a radius of curvature R2 within a preferred range of 0.2 to 0.5 mm and each rib is located at a position distance L3 within a preferred range of 1.8 to 2.0 mm of the trailing tube end 48. The leading end 50 of the tube 42 has a radius R1 within a range of 1.1 to 1.9 mm. The air passageway 43 within the tube 42 is likewise of generally elliptical cross-section having a length L2 within a preferred range of 2.2 to 2.3 mm; and a preferred width D2 within a range of 0.5 to 0.9 mm.

The tube 42 is profiled and geometrically configured for insertion into a groove 56. The groove 56 is of elongate, generally elliptical configuration having a length L1 within a preferred range of 3.65 to 3.8 mm in complement to the elliptical shape of the tube 42. The groove 56 includes a restricted narrower entryway 58 having a nominal cross-sectional width D3 within a preferred range of 0.8 to 1.0 mm. A pair of groove rib-receiving axial detent channels 60, 62 of semi-circular configuration are formed within opposite sides of the groove 56 for complementary respective receipt of the tube locking ribs 52, 54. The channels 60, 62 are spaced approximately a distance L3 within a range of 1.8 to 2.0 mm of the groove entryway 58. Detent channels 60, 62 each have a radius of curvature R2 within a preferred range of 0.2 to 0.5 mm. An inward detent groove portion 64 is formed having a radius of curvature R1 within a preferred range of 1.1 to 1.9 mm and a cross-sectional nominal width D1 within a preferred range of 2.2 to 3.8 mm.

Figure 8A:
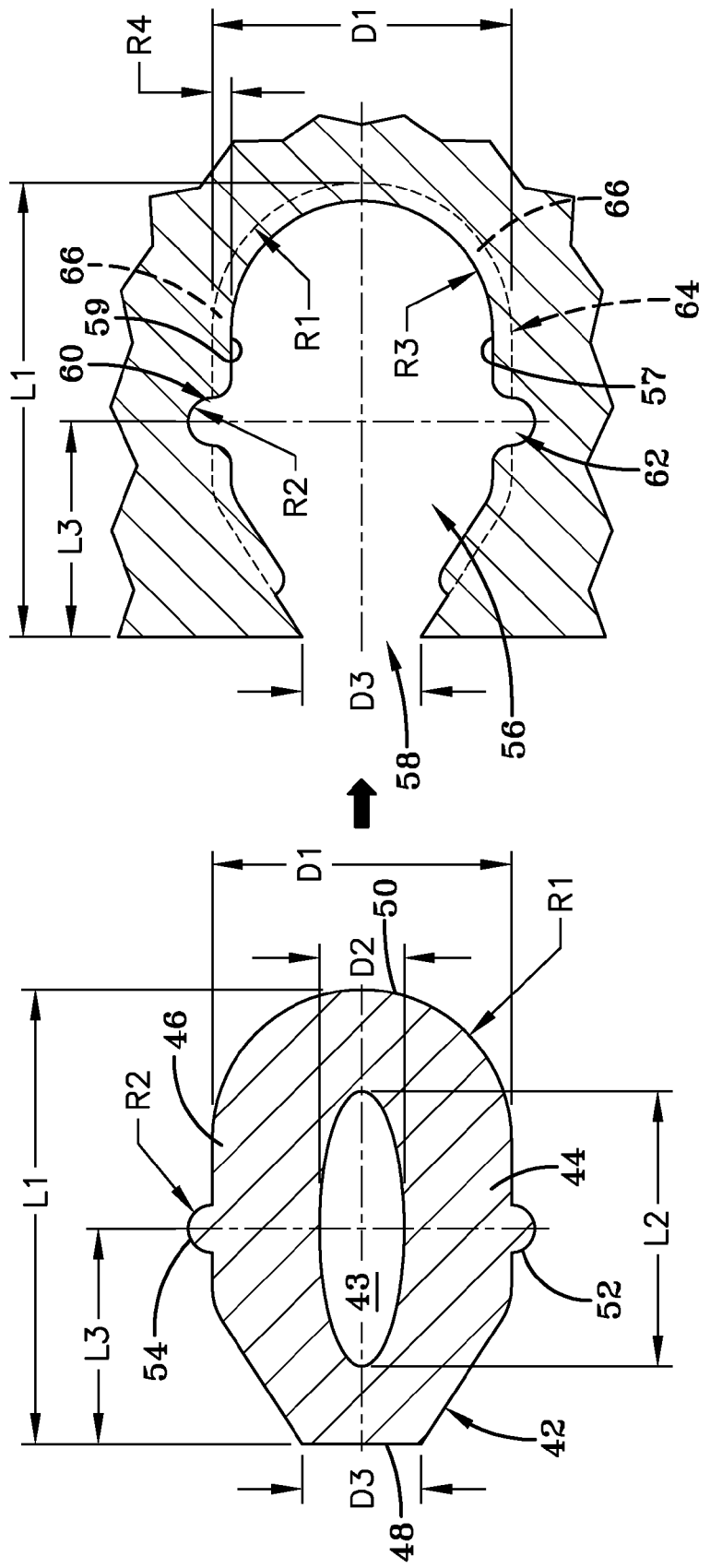
FIG. 8A; Enlarged detail of the preferred tube & groove detail taken from FIG. 2.
Figure 8B:
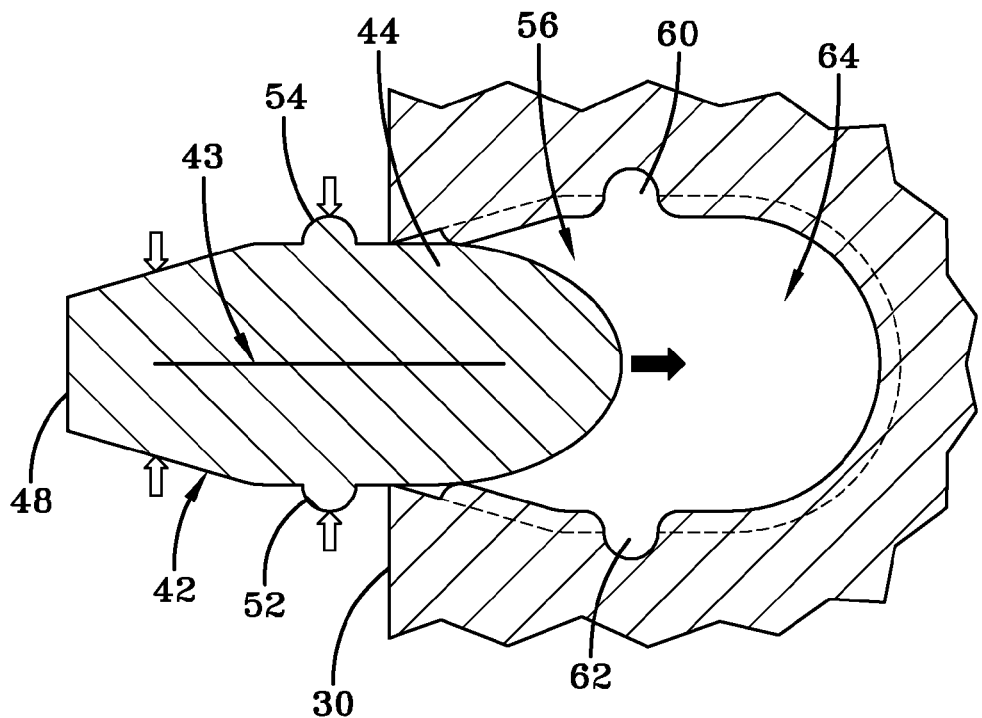
FIG. 8B; Detail showing the preferred tube compressed and being inserted into groove.
Figure 8C:
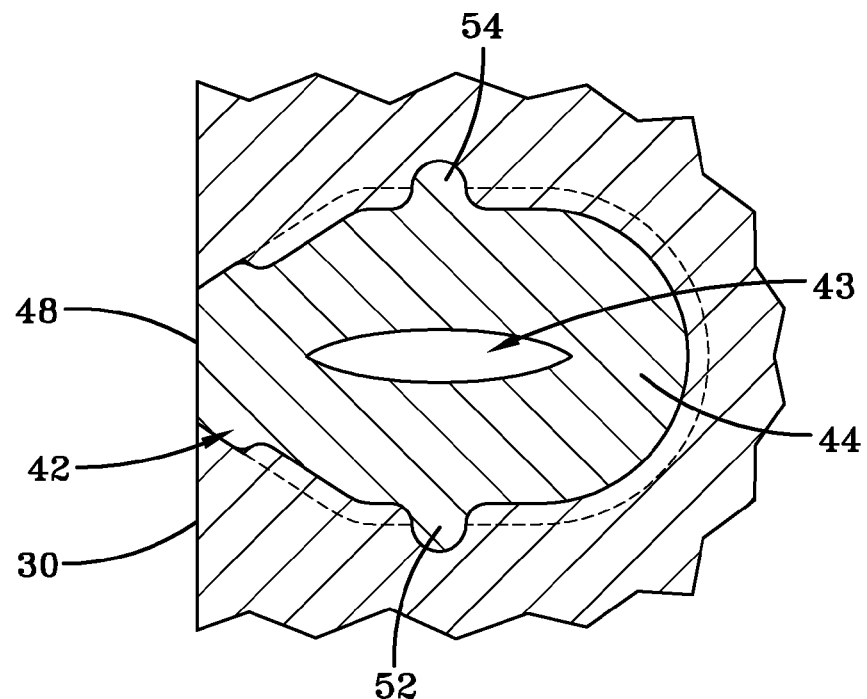
FIG. 8C; Detail showing the preferred tube fully inserted groove at ribbed area of groove.
Figure 8D:
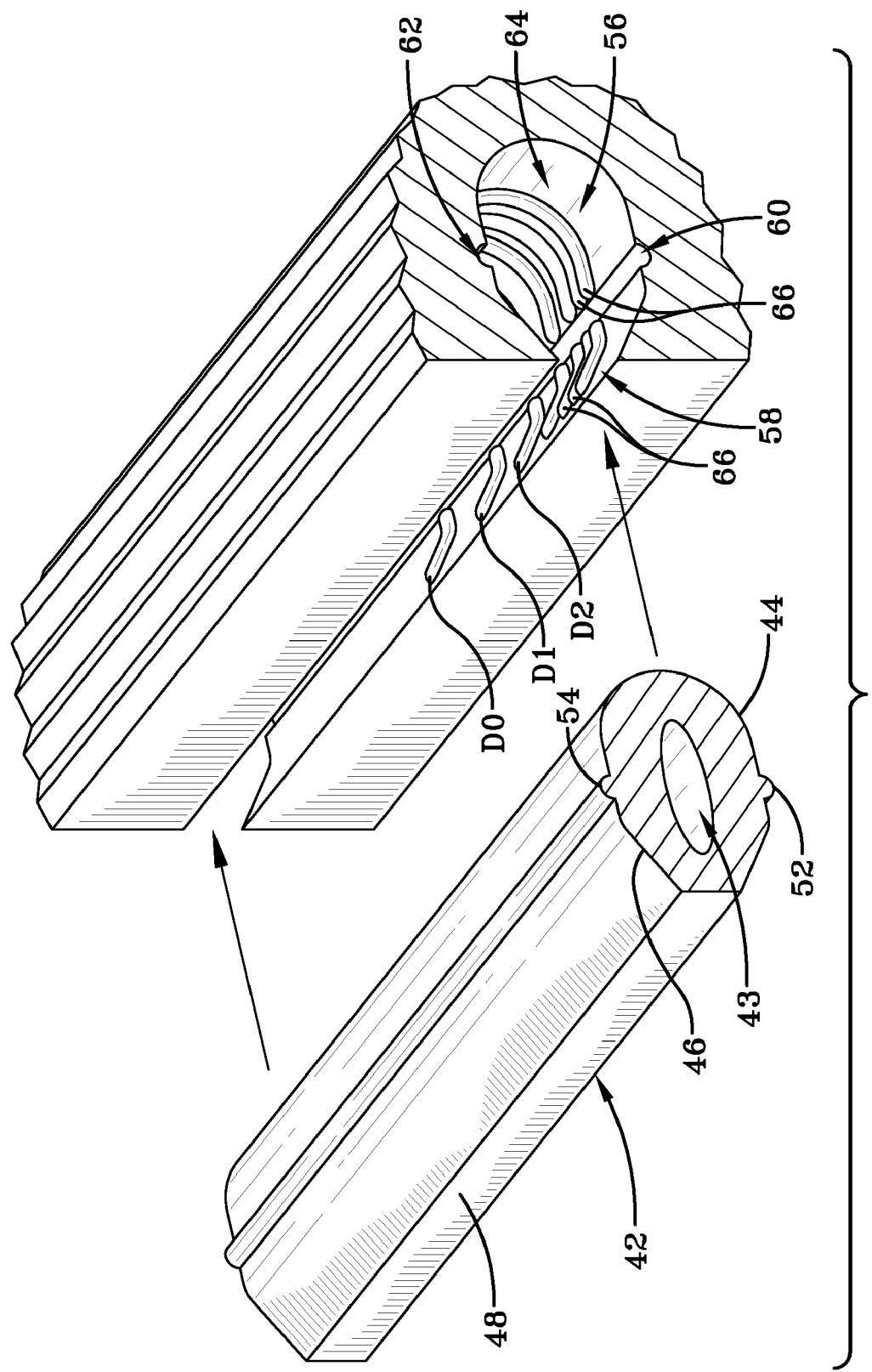
FIG. 8D; Exploded fragmented view of tube being inserted into ribbed groove.

As best seen from FIGS. 8D, 9, 10A and 10B, the tire further formed to provide one or more compression ribs 66 extending the circumference of and projecting into the groove 56. The ribs 66 form a pattern of ribs of prescribed pitch, frequency, and location as will be explained. For the purpose of explanation, the seven compression ribs are referred to generally by numeral 66 in the first rib profile pattern shown, and specifically by the rib designations D0 through D6. The ribs D0 through D6, as will be explained, are formed in a preferred sequence and pitch pattern in order to render the pumping of air through the tube passageway 43 more efficient. The ribs 66 each have a unique and predetermined height and placement within the pattern and, as shown in FIG. 8D, project outward at into the groove 56 at a radius R3 (FIG. 8A) within a preferred range of 0.95 to 1.6 mm.

With reference to FIGS. 1, 2, 3A through 3C, and 4A through E, the peristaltic pump assembly 14 further includes an inlet device 68 and an outlet device 70 spaced apart approximately 180 degrees at respective locations along the circumferential air tube 42. The outlet device 70 has a T-shaped configuration in which conduits 72, 74 direct air to and from the tire cavity 40. An outlet device housing 76 contains conduit arms 78, 80 that integrally extend from respective conduits 72, 74. Each of the conduit arms 78, 80 have external coupling ribs 82, 84 for retaining the conduits within disconnected ends of the air tube 42 in the assembled condition. The housing 76 is formed having an external geometry that complements the groove 56 and includes a flat end 86, a radius generally oblong body 88, and outwardly projecting longitudinal detent ribs 90. So configured, the housing 76 is capable of close receipt into the groove 56 at its intended location with the ribs 90 registering within the groove 56 as represented in FIG. 8A.

The inlet device 68 as seen in FIGS. 4A through 4E includes an elongate outward sleeve body 94 joining to an elongate inward sleeve body 96 at a narrow sleeve neck 98. The outward sleeve body is generally triangular in section. The inward sleeve body 96 has an external geometry of oblong section complementary to the groove 56 and includes a pair of decent ribs 100 extending longitudinally along the body 96. An elongate air entry tube 101 is positioned within the inward sleeve body 96 and includes opposite tube ends 102 and a pattern of entry apertures 104 extending into a central tube passageway. External ribs 106, 108 secure the tube ends 102 into the air tube 42 opposite the outlet device 70.

Figure 6B:
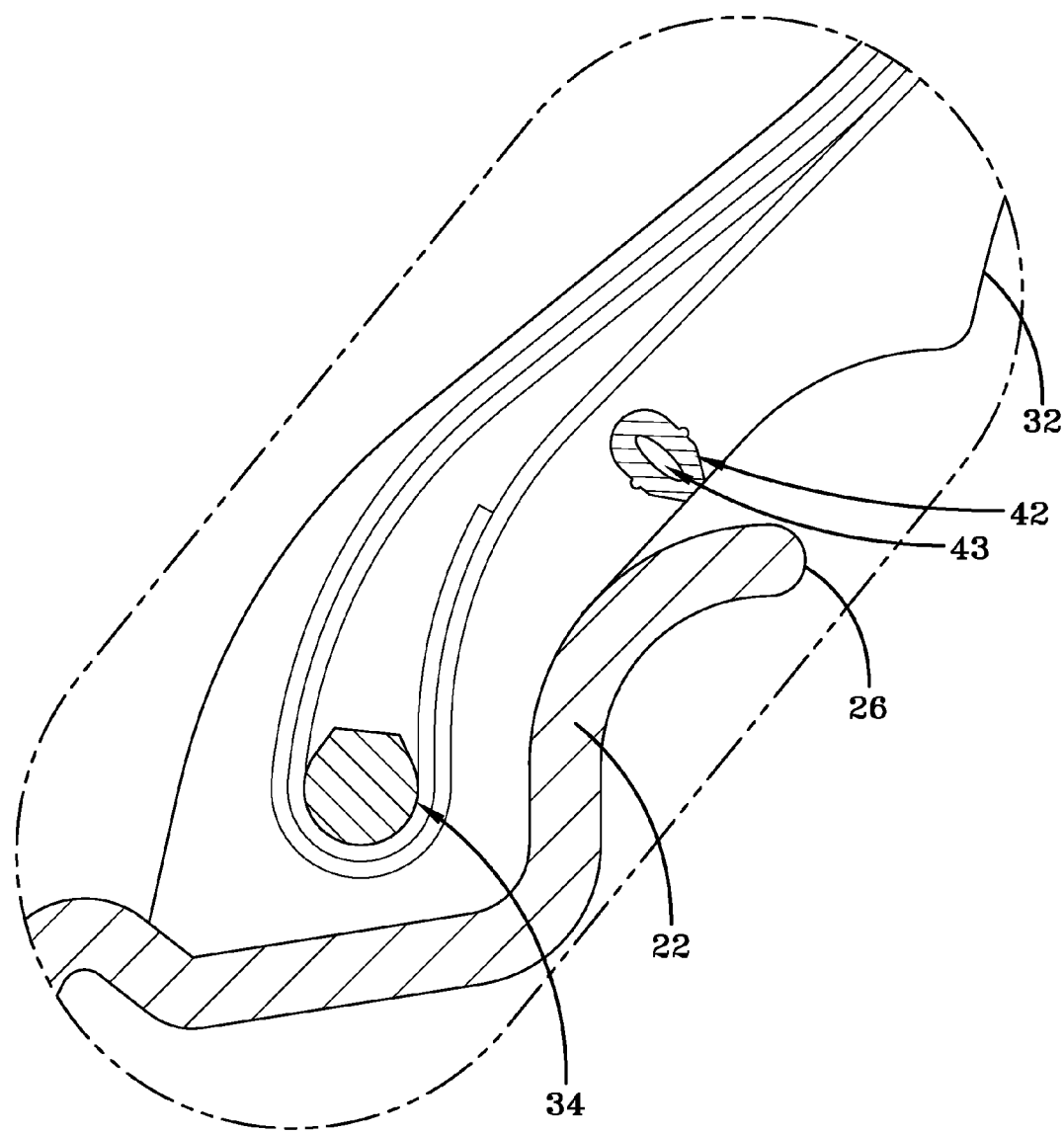
FIG. 6B; Enlarged detail of tube area taken from FIG. 6A, sidewall in non-compressed state.
Figure 7B:
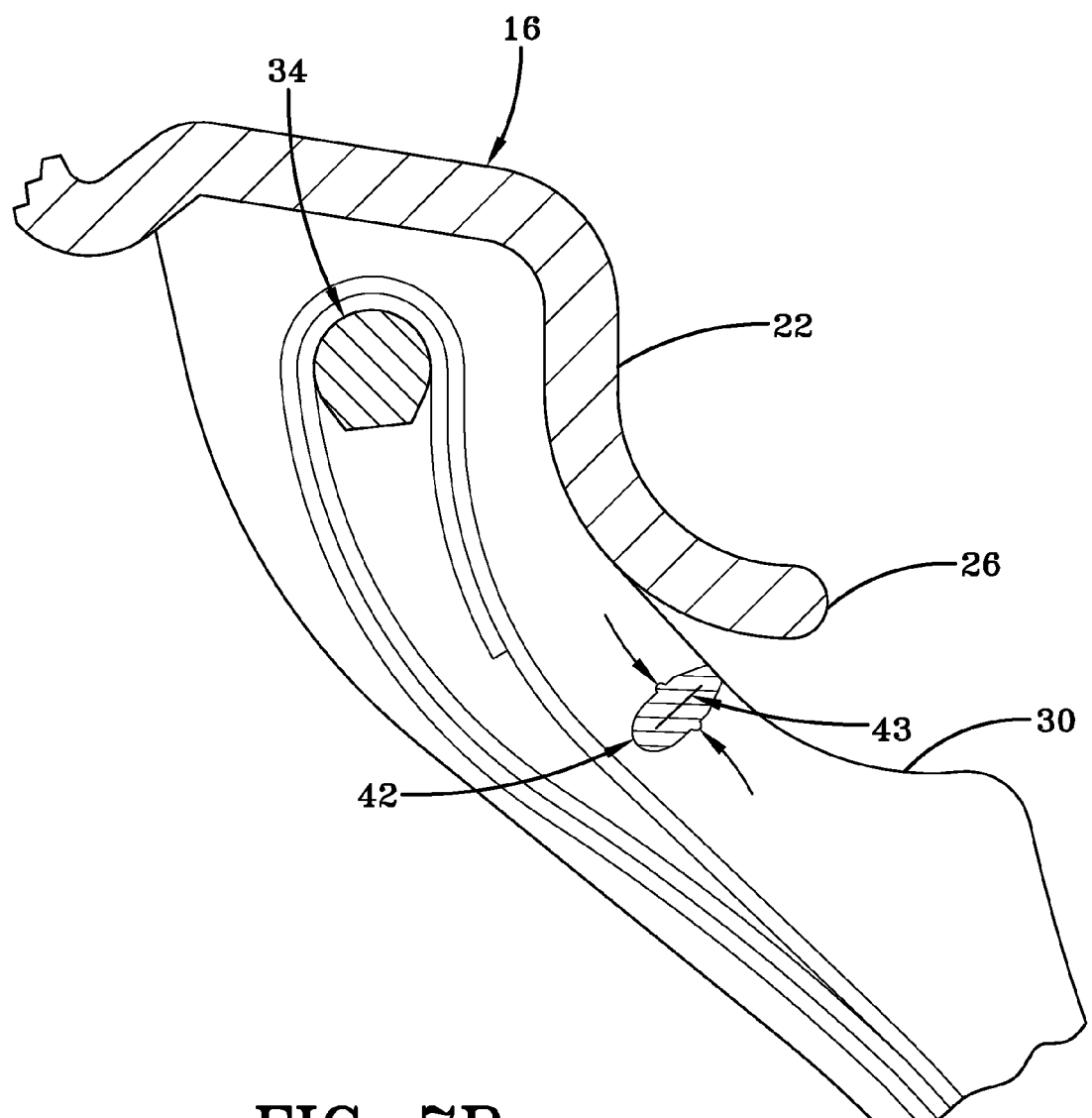
FIG. 7B; Enlarged detail of tube area taken from FIG. 7A, sidewall in compressed state.

As will be appreciated from FIGS. 6A, 6B, 7A, 7B, 8A through D, the pump assembly 14 comprising the air tube 42 and inlet and outlet devices 68, 70 affixed in-line to the air tube 42 at respective locations 180 degrees apart, is inserted into the groove 56. The groove 56 is The groove 56, being defined by groove sidewalls 57, 59, is located at a lower sidewall region of the tire that, when the tire 12 is mounted to the rim 16, positions the air tube 42 above the rim flange ends 26. FIG. 8B shows the air tube 42 diametrically squeezed and collapsed to accommodate insertion into the groove 56. Upon full insertion, as shown in FIG. 8C, the ribs 52, 54 register within the groove channels 60, 62 and the flat outer end 48 of the tube 42 is generally coplanar with the outer surface of the sidewall of the tire 12. Once fully inserted, the air passageway 43 of the tube 42 elastically restores into an open condition to allow the flow of air along the tube during operation of the pump.

Referring to FIGS. 1, 2, 5A, 5B, 6A, 6B, 7A, 7B, 8A through 8D, the inlet device 68 and the outlet device 70 are positioned within the circumference of the circular air tube 42 generally 180 degrees apart. The tire 12 with the tube 42 positioned within groove 56 rotates in a direction of rotation 110, causing a footprint 120 to be formed against the ground surface 118. A compressive force 124 is directed into the tire from the footprint 120 and acts to flatten a segment of the air tube passageway 43 opposite the footprint 120 as shown at numeral 122. Flattening of the segment of the passageway 43 forces air from the segment along tube passageway 43 in the direction shown by arrow 116, toward the outlet device 70.

As the tire continues to rotate in direction 110 along the ground surface 118, the tube 42 will be sequentially flattened or squeezed opposite the tire footprint segment by segment in a direction opposite to the direction of tire rotation 110. A sequential flattening of the tube passageway 43 segment by segment will result and cause evacuated air from the flattened segments to be pumped in the direction 116 within tube passageway 43 to the outlet device 70. Air will flow through the outlet device 70 and to the tire cavity as shown at 130. As referenced by arrow 130, air exiting the outlet device is routed to the tire cavity 40 and serves to re-inflate the tire to a desired pressure level. A valve system to regulate the flow of air to the cavity when the air pressure within the cavity falls to a pre-scribed level is shown and described in pending U.S. patent application Ser. No. 12/775,552, filed May 7, 2010, and incorporated herein by reference.

Figure 5A:
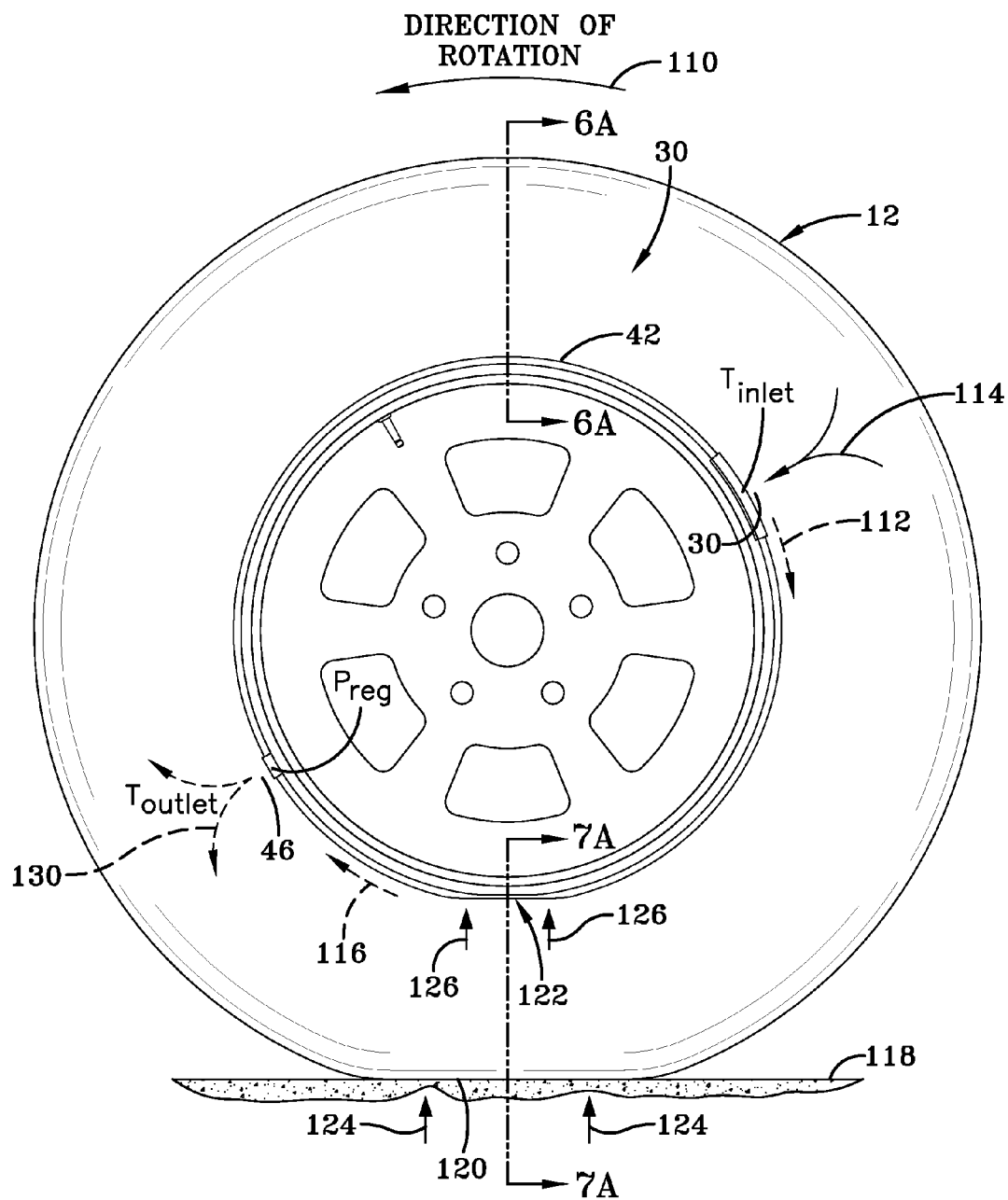
FIG. 5A; Side view of tire rotating with air movement (84) to cavity.
Figure 5B:
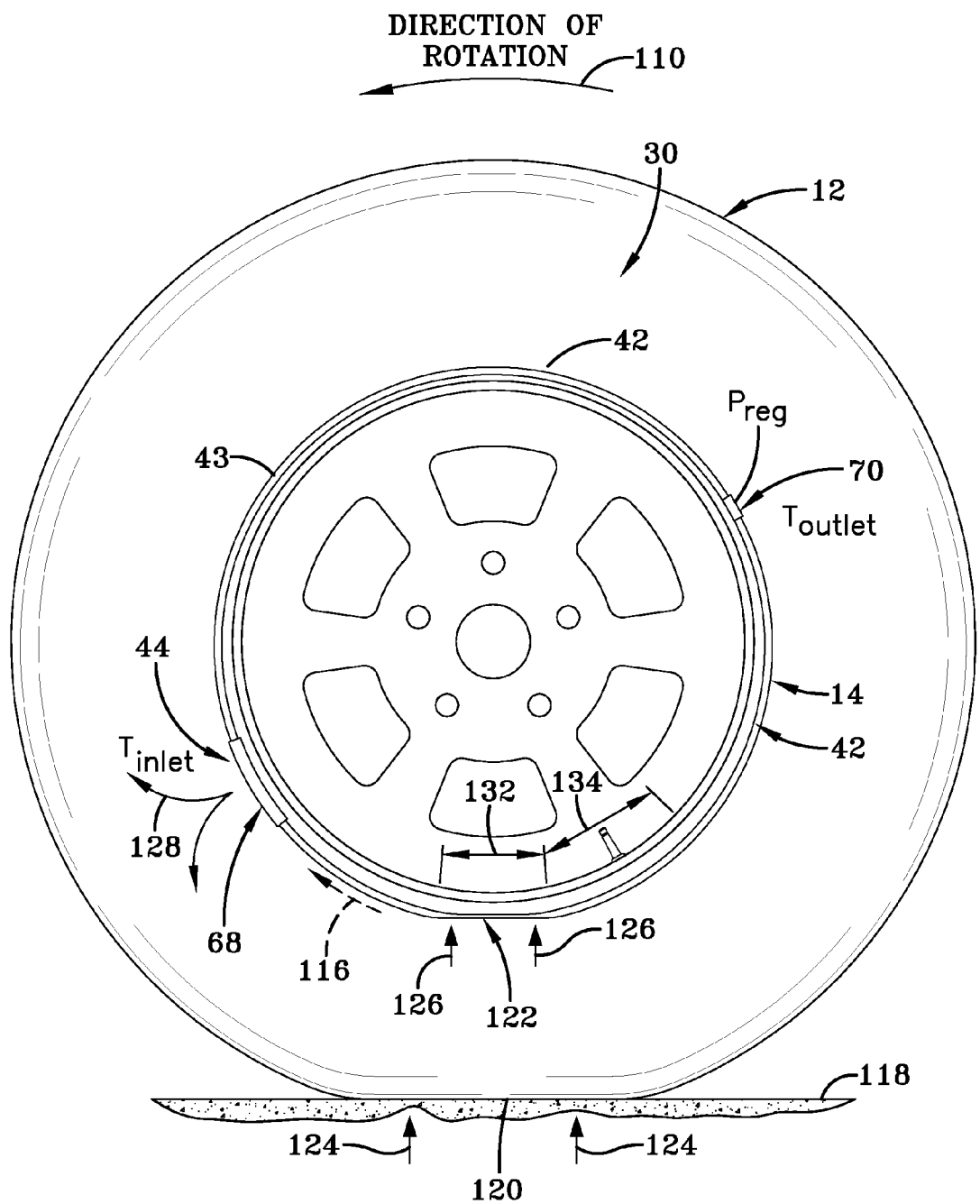
FIG. 5B; Side view of tire rotating with air flushing out filter.

With the tire rotating in direction 110, flattened tube segments are sequentially refilled by air flowing into the inlet device 68 in the direction 114 as shown by FIG. 5A. The inflow of air into the inlet device 68 and then into the tube passageway 43 continues until the outlet device 70, rotating counterclockwise as shown with the tire rotation 110, passes the tire footprint.120. FIG. 5B shows the orientation of the peristaltic pump assembly 14 in such a position. In the position shown, the tube 42 continues to be sequentially flattened segment by segment opposite the tire footprint by compressive force 124. Air is pumped in the clockwise direction 116 to the inlet device 68 where it is evacuated or exhausted outside of the tire. Passage of exhaust air as shown at 128 from the inlet device 68 is through the filter sleeve 92 which is formed of a cellular or porous material or composite. Flow of air through the sleeve 92 and into the tube 101 is thus cleansed of debris or particulates. In the exhaust or reverse flow of air direction 128, the sleeve 92 is cleansed of trapped accumulated debris or particles within the porous medium. With the evacuation of pumped air out of the inlet device 68, the outlet device is in the closed position and air does not flow to the tire cavity. When the tire rotates further in counterclockwise direction 110 until the inlet device 44 passes the tire footprint 120 (as shown in FIG. 5A), the airflow resumes to the outlet device 70 and causes the pumped air to flow out and into the tire cavity 40. Air pressure within the tire cavity is thus maintained at a desired level.

FIG. 5B illustrates that the tube 42 is flattened segment by segment as the tire rotates in direction 110. A flattened segment 134 moves counterclockwise as it is rotated from the footprint while an adjacent segment 132 moves opposite the tire footprint and is flattened. Accordingly, the progression of squeezed or flattened tube segments can be seen to move air toward the outlet device 70 (FIG. 5A) or the inlet device 68 (FIG. 5B) depending on the rotational position of the tire relative to such devices. As each segment is moved by tire rotation away from the footprint 120, the compression forces within the tire from the footprint region are eliminated and the segment is free to resiliently reconfigure into an unflattened state as it refills with air from passageway 43. FIGS. 7A and 7B show a segment of the tube 42 in the flattened condition while FIGS. 6A and 6B show the tube segment in an expanded, unflat configuration prior and after leaving a location opposite the tire footprint. In the original non-flattened configuration, segments of the tube 42 resume an oblong generally elliptical shape in section.

The above-described cycle is then repeated for each tire revolution, half of each rotation resulting in pumped air going to the tire cavity and half of the rotation the pumped air is directed back out the inlet device filter sleeve 92 to self-clean the filter. It will be appreciated that while the direction of rotation 110 of the tire 12 is as shown in FIGS. 5A and 5B to be counterclockwise, the subject tire assembly and its peristaltic pump assembly 14 will function in like manner in a (clockwise) reverse direction of rotation as well. The peristaltic pump is accordingly bi-directional and equally functional with the tire assembly moving in a forward or a reverse direction of rotation.

A preferred location for the air tube assembly 14 is as shown in FIGS. 5A, 5B, 6A, 6B, 7A and 7B. The tube 42 is located within the groove 56 in a lower region of the sidewall 30 of the tire 12. So located, the passageway 43 of the tube 42 is closed by compression strain bending the sidewall groove 56 within a rolling tire footprint as explained above. The location of the tube 42 in the sidewall 30 affords the user freedom of placement and avoids contact between the tube 42 and the rim 16. The higher placement of the tube 42 in the sidewall groove 56 uses the high deformation characteristics of this region of the sidewall as it passes through the tire footprint to close the tube.

The configuration and operation of the groove sidewalls, and in particular the variable pressure pump compression of the tube 42 by operation of ridges or compression ribs 66 within the groove 56 will be explained with reference to FIGS. 8A through 8D, 9, 10A and 10B. In the shown embodiment, the ridges or ribs are referred to generally by numeral 66 and individually as D0 through D6. The groove 56 is preferably of uniform width circumferentially along the side of the tire with the molded in ridges D0 through D6 formed to project into the groove 56 in a preselect sequence, pattern or array. The ridges D0 through D6 act to retain the tube 42 in its preferred orientation within the groove 56 and also apply a variable sequential constriction force to the tube 42.

The uniformly dimensioned pump tube 42 is positioned within the groove 56 as explained previously, preferably by a procedure initiated by mechanically spreading the entryway D3 of the groove 56 apart. The tube 42 is then inserted into groove enlarged opening. The opening to the groove 56 is thereafter released to return to close into the original spacing D3 and thereby capture the tube 42 inside the groove. The longitudinal locking ribs 52, 54 are thus captured into longitudinal grooves 60, 62. The locking ribs 52, 54 resultingly operate to lock the tube 42 inside the groove 56 and prevent unwanted ejection of the tube from the groove during tire operation. Alternatively, if so desired, the tube 42 may be press inserted into the groove 56. The pump tube 42, being of uniform width dimensions and geometry, is capable of being manufactured in large quantities. Moreover, a uniform dimensioned pump tube 42 reduces the overall assembly time and material cost and the complexity of tube inventory. From a reliability perspective, this results in less chance for error.

Figure 9:
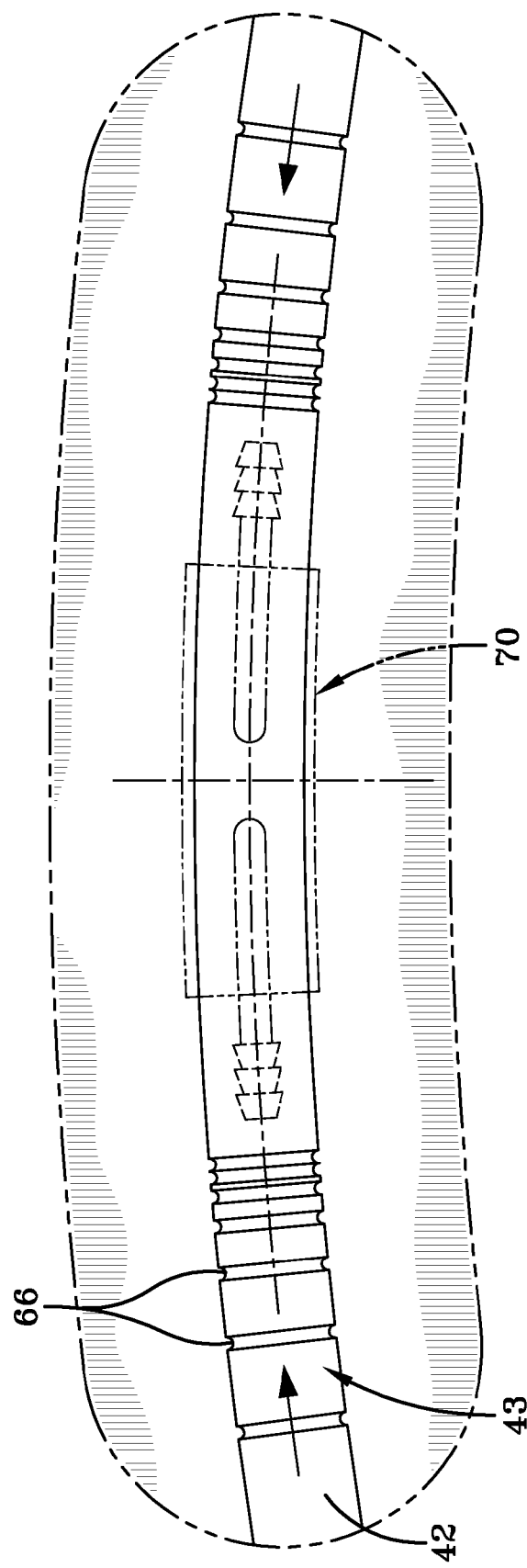
FIG. 9; Enlarged detail taken from FIG. 2 showing the "first" rib profile area located on both side of the outlet to cavity connector.

The circumferential ridges D0 through D6 projecting into the groove 56 increase in frequency (number of ridges per axial groove unit of length) toward the inlet passage end of the tube 42 represented by the outlet device 70. Each of the ridges D0 through D6 has a common radius dimension R4 within a preferred range of 0.15 to 0.30 mm. The spacing between ridge D0 and D1 is the greatest, the spacing between D1 and D2 the next greatest, and so on until the spacing between ridges D5 and D6 is nominally eliminated altogether. While seven ridges are shown, more or fewer ridges may be deployed at various frequency along the groove if desired. The projection of the ridges into the groove 56 by radius R4 serve a twofold purpose. First, the ridges D0 through D6 engage the tube 42 and prevent the tube 42 from migrating or "walking" along the groove 56 during tire operation from the intended location of the tube. Secondly, the ridges D0 through D6 act to compress the segment of the tube 42 opposite each ridge to a greater extent as the tire rotates through its rotary pumping cycle as explained above. The flexing of the sidewall manifests a compression force through each ridge D0 through D6 and constricts the tube segment opposite such ridge to a greater extent than otherwise would occur in tube segments opposite non-ridged portions of the groove 56. As seen in FIGS. 10A and 10B, as the frequency of the ridges increases in the direction of air flow, a pinching of the tube passageway 43 progressively occurs until the passageway constricts to the size shown at numeral 136, gradually reducing the air volume and increasing the pressure. As a result, with the presence of the ridges, the tube groove 56 provides variable pumping pressure within the pump tube 42 configured to have uniform dimension therealong. As such, the sidewall groove 56 may be said to constitute a variable pressure pump groove that functions to apply a variable pressure to a tube situated within the groove. It will be appreciated that the degree of pumping pressure variation will be determined by the pitch or ridge frequency within the groove 56 and the amplitude of the ridges deployed relative to the diametric dimensions of the tube passageway 43. The greater the ridge amplitude relative to tube passageway diameter, the more air volume will be reduced in the tube segment opposite the ridge and pressure increased, and vice versa. FIG. 9 depicts the attachment of the tube 42 to the outlet device 70 and the direction of air flow on both sides into device 70.

Figure 11:
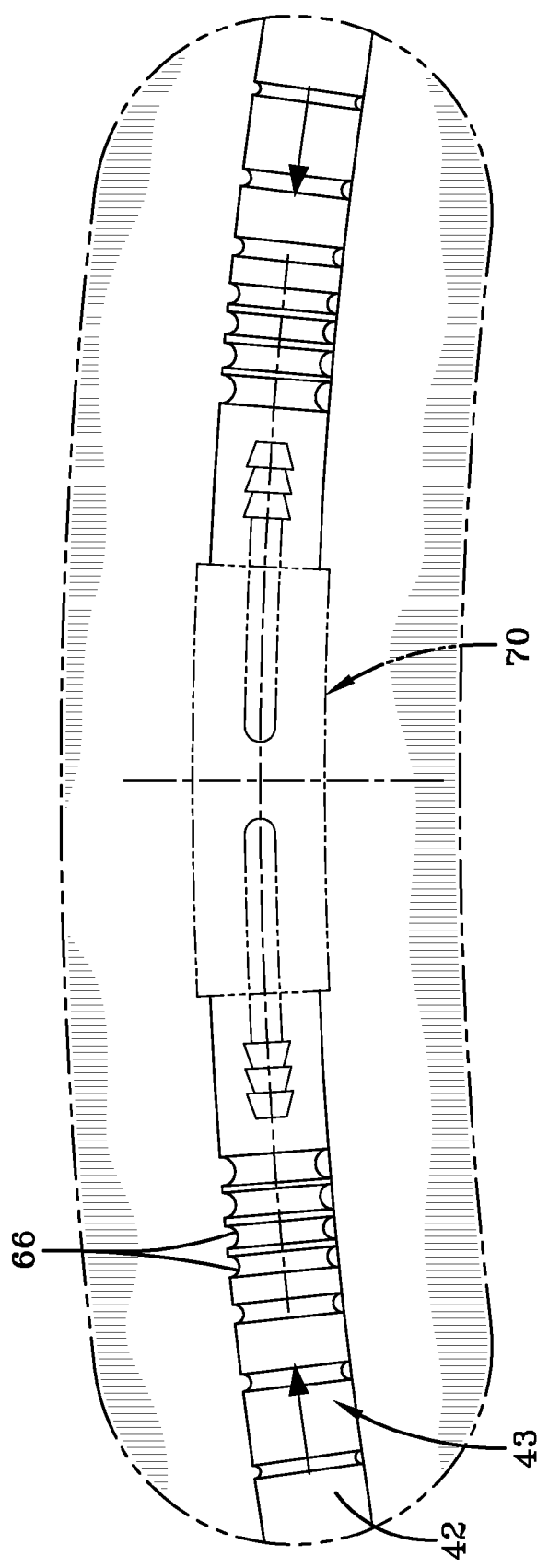
FIG. 11; Enlarged detail taken from FIG. 2 showing the "second" rib profile area located on both side of the outlet to cavity connector.

FIG. 11 shows a second alternative rib profile area located on both sides of the outlet to cavity connector device 70. FIG. 12A shows an enlarged detail of the groove 56 with the alternative second rib profile and FIG. 12B shows an enlarged detail of the tube 42 pressed into the second rib profile. With reference to FIGS. 11, 12A, 12B, the ridges or ribs D0 through D6 in the alternative embodiment have a frequency pattern similar to that described above in reference to FIGS. 10A, 10B but each rib is also formed having a unique respective amplitude as well. Each of the ribs D0 through D6 is generally of semi-circular cross-section having a respective radius of curvature R1 through R7 respectively. The change radii of curvatures of ridges or ribs D0 through D6 are within preferred exemplary ranges: Δ=0.02 to 0.036 mm.

The number of ridges and respective radii of each may be constructed outside the preferred ranges above to suit a particular dimension preference or application if desired. The increasing radius of curvature in the direction of air flow results in the ribs D0 through D6 projecting at an increasing amplitude and to an increasing extent into the tube channel 43 toward the outlet device 70. As such, the passageway 43 will constrict to a narrower region 138 toward the outlet device and cause a commensurately greater increase in air pressure from a reduction in air volume. The benefit of such a configuration is that the tube 42 may be constructed smaller than otherwise necessary in order to achieve a preferred desired air flow pressure along the passageway and into the tire cavity from the outlet device 70. A smaller sized tube 42 is economically and functionally desirable in allowing a smaller groove 56 within the tire to be used, whereby resulting a minimal structural discontinuity in the tire sidewall.

Figure 13A:
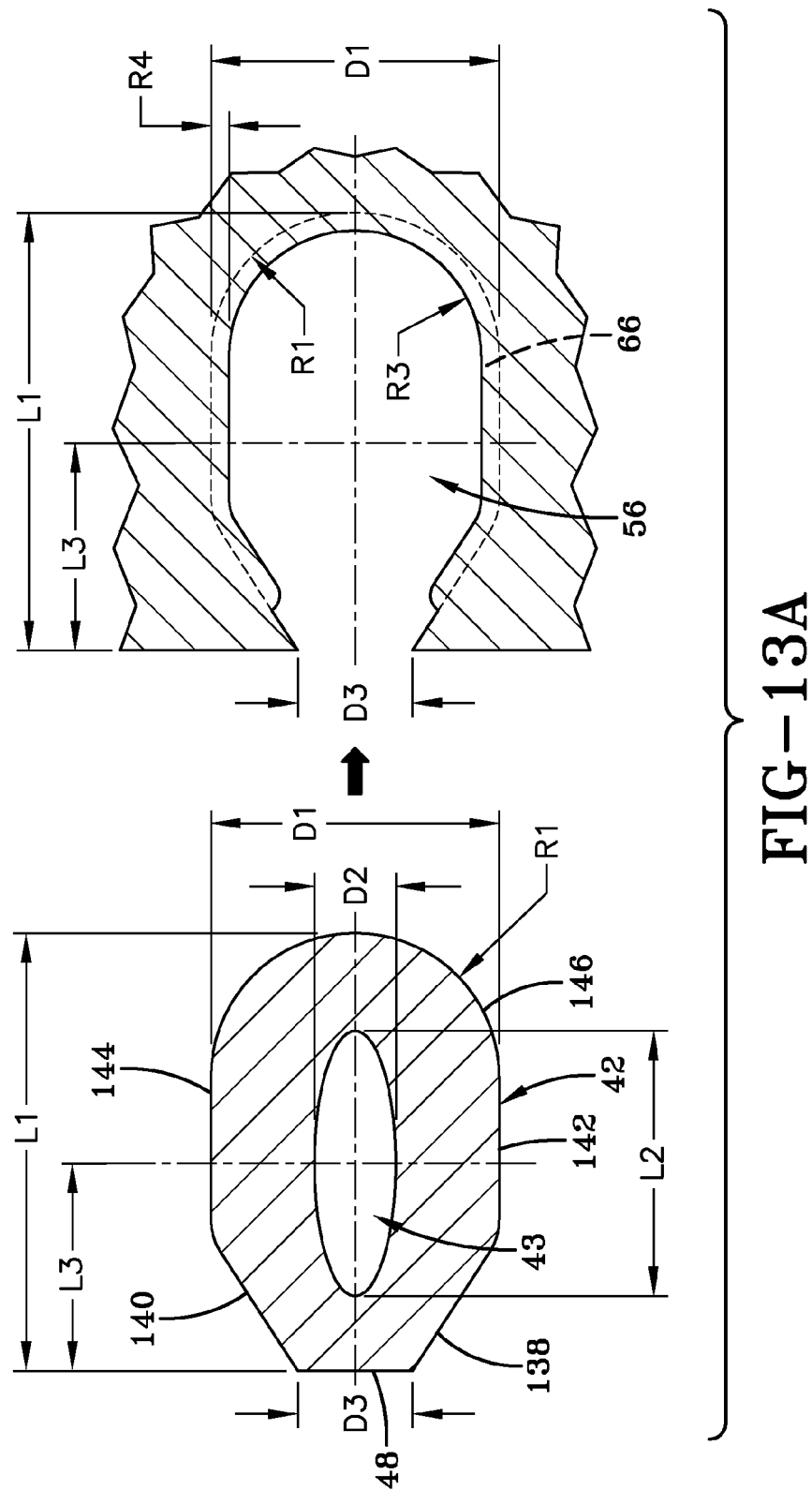
FIG. 13A; Enlarged view of a "second" embodiment of a tube & groove detail.
Figure 13B:
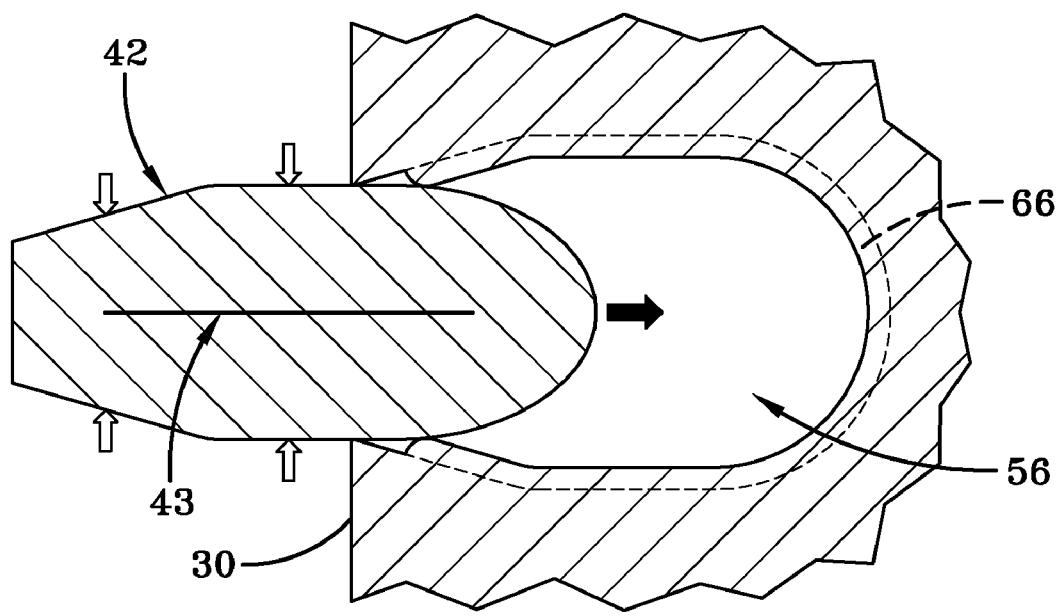
FIG. 13B; Detail showing tube from FIG. 13A being compressed and inserted into groove.
Figure 13C:
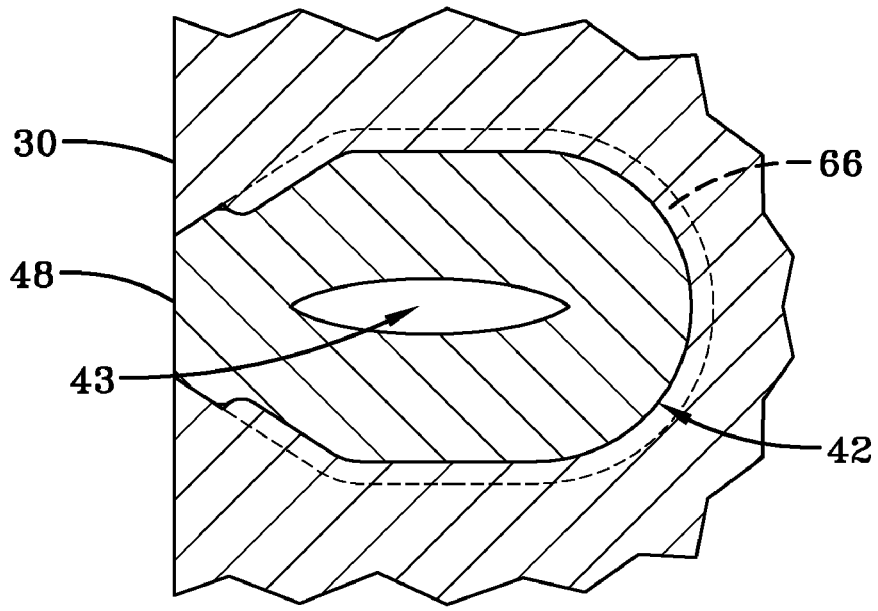
FIG. 13C; Detail showing tube from FIG. 13A fully inserted into groove.

FIGS. 13A through C show a second embodiment of a tube 42 and groove 56 detail in which the detent ribs 90 in the FIG. 8A through 8C embodiment are eliminated as a result of rib and groove modification. In the second embodiment of FIGS. 13A through 13C, the tube 42 is configured having an external geometry and passageway configuration having indicated dimensions within preferred ranges specified as follows:

D1=2.2 to 3.8 mm;
D2=0.5 to 0.9 mm;
D3=0.8 to 1.0 mm;
R4=0.15 to 0.30 mm;
L1=3.65 to 3.8 mm;
L2=2.2 to 2.3 mm;
L3=1.8 to 2.0 mm.

The above ranges are preferred exemplary values that may be modified to suit a particular dimensional preference, tire geometry, or tire application if desired. As shown, the external configuration of the tube 42 includes beveled surfaces 138, 140 adjoining the end surface 48; parallel and opposite straight intermediate surfaces 142, 144 adjoining the beveled surfaces 138, 140, respectively; and a radius nose or forward surface 146 adjoining the intermediate surfaces. As seen from FIGS. 13B and 13C, the tube 42 is compressed for press insertion into the groove 56 and, upon full insertion, expands. The constricted opening of the groove 56 at the sidewall surface functions to retain the tube 42 securely within the groove 56.

Figure 14A:
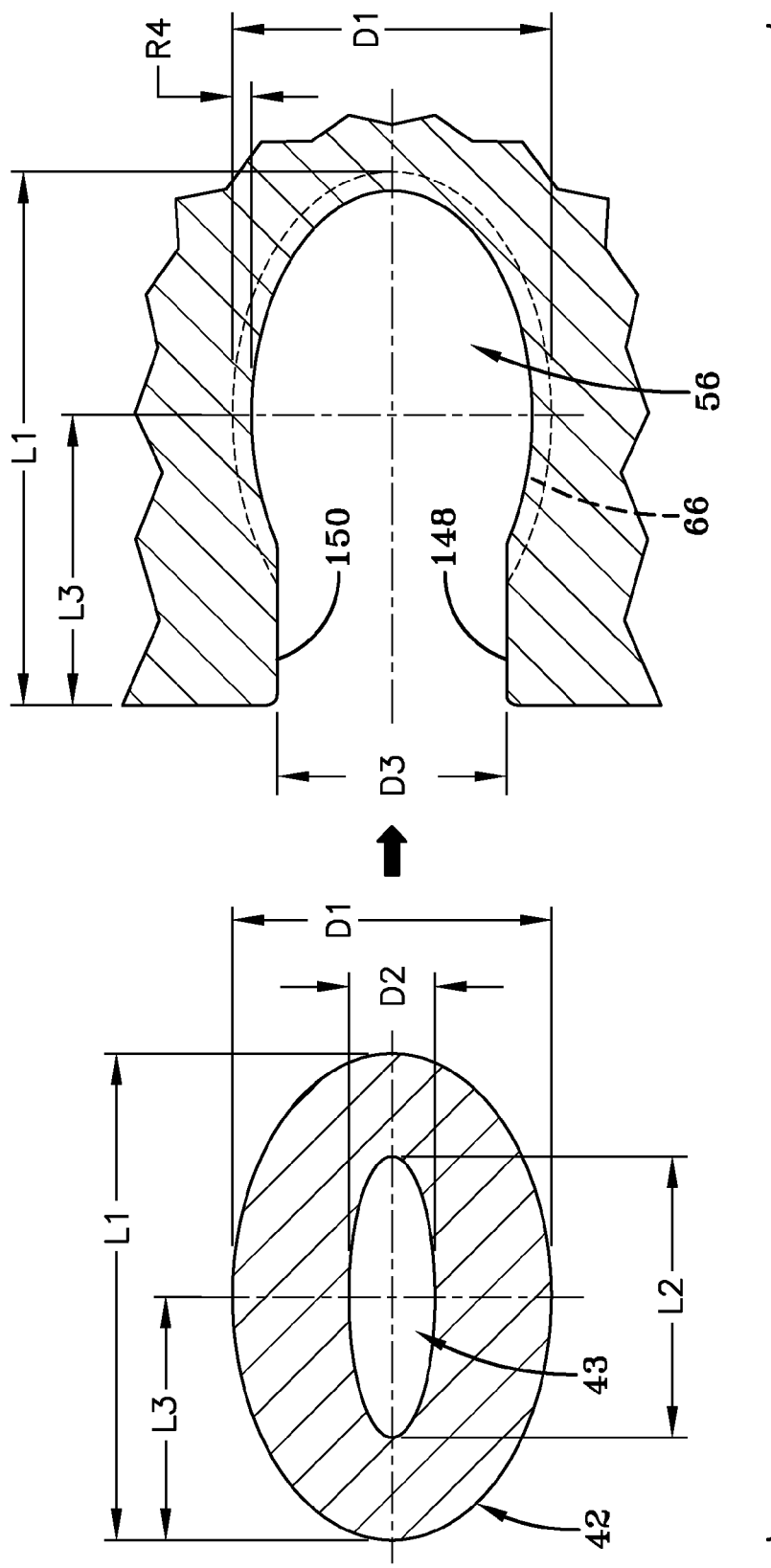
FIG. 14A; Enlarged view of a "third" embodiment of a tube & groove detail.
Figure 14B:
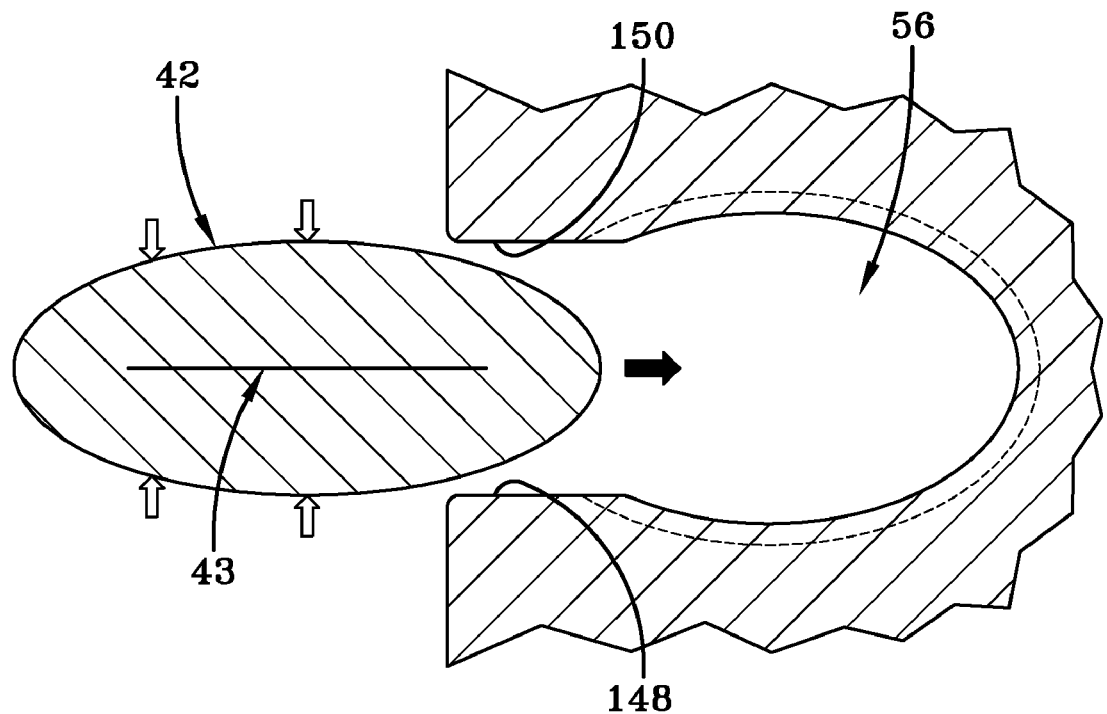
FIG. 14B; Detail showing tube from FIG. 14A being compressed and inserted into groove.
Figure 14C:
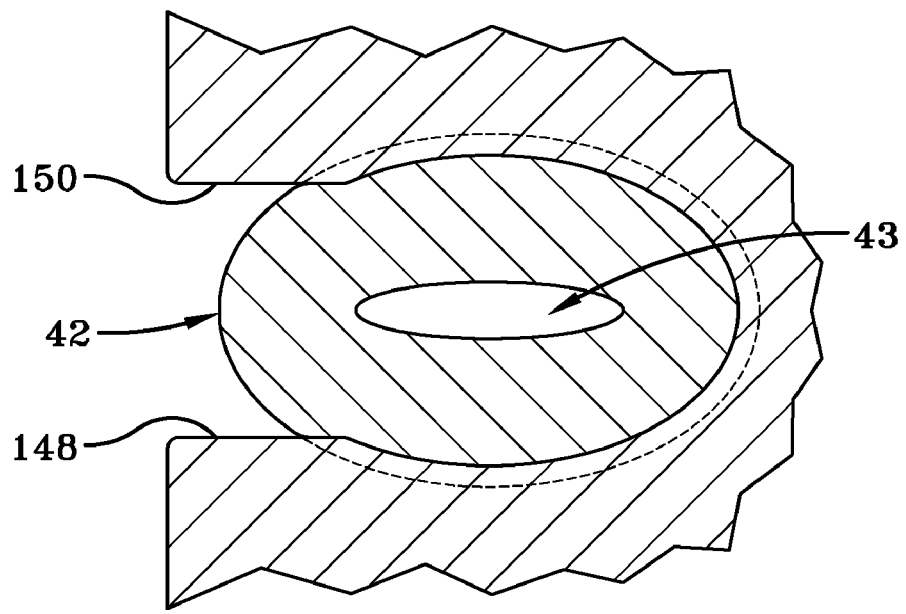
FIG. 14C; Detail showing tube from FIG. 14A fully inserted into groove.

FIGS. 14A through 14C show a third alternative embodiment of a tube 42 and groove 56 configuration. FIG. 14A is an enlarged view of the third embodiment detail; FIG. 14B a detail view showing the third embodiment tube 42 being compressed and inserted into the groove 56; and FIG. 14C a detail view showing the tube 42 fully inserted into the groove 56. The tube 42 is generally of elliptical cross-section inserting into a like-configured groove 56. The groove 56 is formed having a narrow entryway formed between opposite parallel surfaces 148, 150. In the third embodiment of FIGS. 14A through 14C, the tube 42 is configured having an external geometry and passageway configuration having noted dimensions within preferred ranges specified as follows:

D1=2.2 to 3.8 mm;
D2=0.5 to 0.9 mm;
D3=0.8 to 1.0 mm;
R4=0.15 to 0.30 mm;
L1=3.65 to 3.8 mm;
L2=2.2 to 2.3 mm;
L3=1.8 to 2.0 mm.

The above ranges are preferred exemplary values that may be modified to suit a particular dimensional preference, tire geometry, or tire application if desired.

Figure 15B:
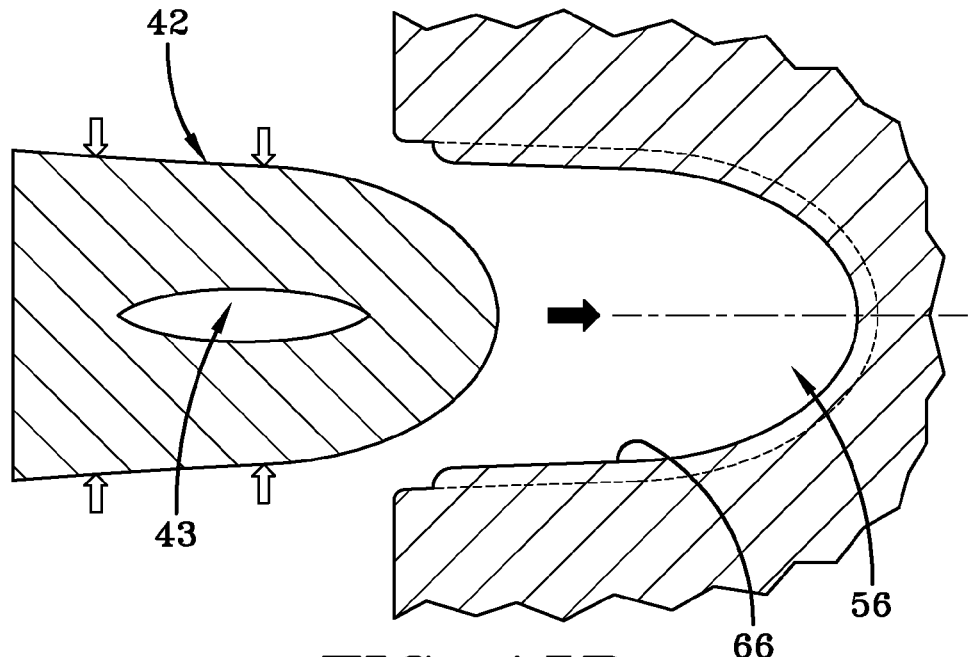
FIG. 15B; Detail showing tube from FIG. 15A being compressed and inserted into groove.
Figure 15C:
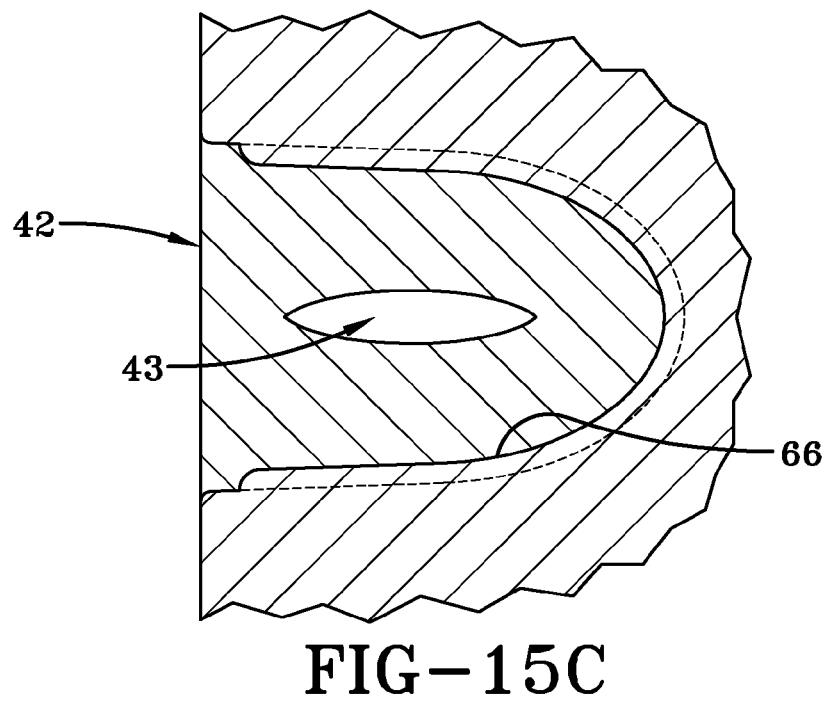
FIG. 15C; Detail showing tube from FIG. 15A fully inserted into groove.

FIGS. 15A through 15C show a fourth alternative embodiment of a tube 42 and groove 56 configuration. FIG. 15A is an enlarged view of the fourth embodiment detail; FIG. 15B a detail view showing the fourth embodiment tube 42 being compressed and inserted into the groove 56; and FIG. 15C a detail view showing the tube 42 fully inserted into the groove 56. The tube 42 is generally of parabolic cross-section inserting into a like-configured groove 56. The groove 56 is formed having an entryway sized to closely accept the tube 42 therein. The ridges 66 engage the tube 42 once it is inserted into the groove 56. In the fourth embodiment of FIGS. 15A through 15C, the tube 42 is configured having an external geometry and passageway configuration having noted dimensions within preferred ranges specified as follows:

D1=2.2 to 3.8 mm;
D2=0.5 to 0.9 mm;
D3=2.5 to 4.1 mm;
L1=3.65 to 3.8 mm;
L2=2.2 to 2.3 mm;
L3=1.8 to 2.0 mm.

The above ranges are preferred exemplary values that may be modified to suit a particular dimensional preference, tire geometry, or tire application if desired.

From the forgoing, it will be appreciated that the subject invention provides a bi-directionally peristaltic pump for air maintenance of a tire. The circular air tube 42 flattens segment by segment and closes in the tire footprint 100. The air inlet device 68 may include an outer filter sleeve 92 formed of porous cellular material and thereby render device 68 as self-cleaning. The outlet device 70 employs a valve unit (see co-pending U.S. patent application Ser. No. 12/775,552, filed May 7, 2010, incorporated herein by reference). The peristaltic pump assembly 14 pumps air under rotation of the tire in either direction, one half of a revolution pumping air to the tire cavity 40 and the other half of a revolution pumping air back out of the inlet device 68. The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

The tire air maintenance system further incorporates a variable pressure pump groove 56 configured having one or more inwardly directed ridges or ribs that engage and compress a segment of the air tube 42 opposite to such rib(s). The pitch or frequency of the rib series is preferred to increase toward the outlet device 70 to gradually reduce the air volume within the passageway 43 by compressing the tube 42. The reduction in air volume increases the air pressure within the tube passageway 43 and thereby facilitates a more efficient air flow from the tube into the tire cavity. The increase in tube pressure is achieved by engagement by the ribs 66 of the groove 56 and the tube 42 having uniform dimensions along the tube length. The tube 42 may thus be made of uniform dimension and of relatively smaller size without compromising the flow pressure of air to the tire cavity necessary to maintain tire air pressure. The pitch and amplitude of the ridges 66 may both be varied to better achieve the desired pressure increase within the tube passageway.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire assembly comprising:
a tire having a tire cavity, first and second sidewalls extending respectively from first and second tire bead regions to a tire tread region;
the first sidewall having at least one bending region operatively bending within a rolling tire footprint;
a sidewall groove defined by groove sidewalls positioned within the bending region of the first tire sidewall, the groove deforming segment by segment between a non-deformed state and a deformed constricted state in response to the bending of the first sidewall bending region within the rolling tire footprint;
an air tube positioned within the sidewall groove in contacting engagement with the groove sidewalls, the air tube having an axial air passageway resiliently transfiguring segment by segment between an expanded sectional configuration and at least a partially collapsed sectional configuration responsive to respective segment by segment engagement by the groove sidewalls against the air tube within the rolling tire footprint;
at least one projecting ridge extending from a groove sidewall segment into the groove, the at least one projecting ridge operatively positioned to engage a respective opposite segment of the air tube and constrict a respective opposite segment of the air passageway extending through the opposite segment of the air tube into a relatively smaller sectional dimension as the opposite air tube segment rolls through the tire footprint.

2. The tire assembly of claim 1, wherein the at least one projecting ridge comprises an annular rib integrally formed with the sidewall and extending a circumference of the sidewall groove.

3. The tire assembly of claim 2, wherein the at least one projecting ridge comprises a component of a plurality of projecting ridges spaced apart along the air tube passageway at a predetermined spacing frequency.

4. The tire assembly of claim 3, wherein the spacing frequency of the plurality of projecting ridges increases in a direction of air flow within the air passageway.

5. The tire assembly of claim 3, wherein the spacing between adjacent projecting ridges decreases in a direction of air flow within the air passageway.

6. The tire assembly of claim 5, wherein further comprising an outlet device positioned along the air tube for directing air from the air tube toward the tire cavity, and wherein the direction of air flow in an operative cycle being toward the outlet device.

7. The tire assembly of claim 3, wherein each of the plurality of ridges has a respective projecting amplitude into the air passageway.

8. The tire assembly of claim 7, wherein the respective projecting amplitudes of at least two of the plurality of ridges are mutually differentiated.

9. The tire assembly of claim 8, wherein the plurality of ridges increase in respective projecting amplitude in the direction of air flow within the air tube.

10. The tire assembly of claim 9, wherein the spacing frequency of the projecting ridges increases in a direction of air flow within the air passageway.

11. The tire assembly of claim 9, wherein the spacing between adjacent projecting ridges decreases in a direction of air flow within the air passageway.

12. The tire assembly of claim 11, wherein further comprising an outlet device positioned along the air tube for directing air from the air tube toward the tire cavity, and wherein the direction of air flow in an operative cycle being toward the outlet device.

13. The tire assembly of claim 12, wherein the air tube comprises an annular body extending substantially a circumference of the tire first sidewall and the sidewall groove is annular and located within a lower region of the first tire sidewall.

14. The tire assembly of claim 13, wherein substantially an entirety of the air tube resides within the sidewall groove.

15. A tire assembly comprising:
   a tire having a tire cavity, first and second sidewalls extending respectively from first and second tire bead regions to a tire tread region;
   the first sidewall having at least one bending region operatively bending within a rolling tire footprint;
   a sidewall groove defined by groove sidewalls positioned within the bending region of the first tire sidewall, the groove deforming segment by segment between a non-deformed state and a deformed constricted state in response to the bending of the first sidewall bending region within the rolling tire footprint;
   an air tube positioned within the sidewall groove in contacting engagement with the groove sidewalls, the air tube having an axial air passageway resiliently transfiguring segment by segment between an expanded sectional configuration and at least a partially collapsed sectional configuration responsive to respective segment by segment engagement by the groove sidewalls against the air tube within the rolling tire footprint;
   a plurality of adjacent projecting ridges extending from a groove sidewall segment into the groove, the projecting ridges operatively positioned to sequentially engage a respective opposite segment of the air tube and constrict a respective opposite segment of the air passageway extending through the opposite segment of the air tube into a relatively smaller sectional dimension as the opposite air tube segment rolls through the tire footprint.

16. The tire assembly of claim 15, wherein the projecting ridges each comprise an annular rib integrally formed with the sidewall and substantially extending a circumference of the sidewall groove, and the plurality of projecting ridges spaced apart along the air tube passageway at a predetermined spacing frequency.

17. The tire assembly of claim 16, wherein the spacing between adjacent projecting ridges decreases in a direction of air flow within the air passageway.

18. The tire assembly of claim 17, wherein further comprising an outlet device positioned along the air tube for directing air from the air tube toward the tire cavity, and wherein the direction of air flow in an operative cycle being toward the outlet device.

19. The tire assembly of claim 15, wherein each of the plurality of ridges has a respective projecting amplitude into the air passageway and the projecting amplitude of the plurality of ridges increasing in the direction of air flow within the air tube.

20. The tire assembly of claim 19, further comprising an outlet device positioned along the air tube for directing air from the air tube toward the tire cavity, and wherein the direction of air flow in an operative cycle being toward the outlet device, and wherein the spacing between adjacent projecting ridges decreases in a direction of air flow within the air passageway toward the outlet device.

* * * * *